United States Patent

Takano

Patent Number: 5,924,043
Date of Patent: Jul. 13, 1999

[54] METHOD AND APPARATUS FOR CONTROLLING TRANSMISSION POWER IN A CELLULAR MOBILE COMMUNICATION SYSTEM

[75] Inventor: Michiaki Takano, Tokyo, Japan

[73] Assignee: Mitsubishi Denki Kabushiki Kaisha, Tokyo, Japan

[21] Appl. No.: 08/850,223

[22] Filed: May 1, 1997

[30] Foreign Application Priority Data

Oct. 18, 1996 [JP] Japan ................................. 8-276206

[51] Int. Cl.[6] .......................... H04B 1/00; H04B 7/00
[52] U.S. Cl. ........................ 455/522; 455/69; 370/335
[58] Field of Search ............................ 455/69, 522, 422, 455/507, 517, 524, 62, 70, 575; 370/327, 329, 335, 342, 320

[56] References Cited

U.S. PATENT DOCUMENTS

| | | | |
|---|---|---|---|
| 3,940,695 | 2/1976 | Sickles, II | 455/69 |
| 5,056,109 | 10/1991 | Gilhousen et al. | |
| 5,086,508 | 2/1992 | Furuno | 455/69 |
| 5,241,690 | 8/1993 | Larsson et al. | 455/522 |
| 5,257,283 | 10/1993 | Gilhousen et al. | 455/69 |
| 5,490,287 | 2/1996 | Itoh et al. | 455/69 |
| 5,574,984 | 11/1996 | Reed et al. | 455/522 |
| 5,727,033 | 3/1998 | Weaver et al. | 455/69 |
| 5,751,763 | 5/1998 | Bruckert | 455/522 |
| 5,771,461 | 6/1998 | Love et al. | 455/522 |

FOREIGN PATENT DOCUMENTS

| | | |
|---|---|---|
| A-7226709 | 8/1995 | Japan. |
| A-7283783 | 10/1995 | Japan. |
| 91 07037 | 5/1991 | WIPO. |

Primary Examiner—Reinhard J. Eisenzopf
Assistant Examiner—Edan Orgad

[57] ABSTRACT

A power control apparatus for controlling transmission power of a mobile unit through a step size based power control implemented in a closed loop control system in a cellular mobile communication system which improves power control performance by reducing power control error and increasing system channel capacity involving power control delay. The improved power control apparatus has a feedback function of a transmission power control command signal, transmission power command (TPC) bit, implemented in an adjuster including an adder, a delay circuit, and an amplifier at a base station. Through the TPC-bit feedback function, the power control error of transmission power from the mobile unit not adjusted based upon a TPC bit currently generated and transmitted to the mobile unit due to the power control delay is adjusted with a power predicted through the feedback loop based upon the same TPC bit to generate a quality TPC bit.

23 Claims, 31 Drawing Sheets

Fig.12

| | SERIALS | |
|---|---|---|
| M | COUNT | FREQUENCY (COUNT/S) |
| 1 | 1 | 1/10 |
| 2 | 1 | 1/10 |
| 3 | 1 | 1/10 |
| 4 | 1 | 1/10 |

Fig.14

| GROUP-SERIALS | | |
|---|---|---|
| N | COUNT | FREQUENCY (COUNT/S) |
| 2 | 6 | 6/10 |
| 3 | 3 | 3/10 |
| 4 | 1 | 1/10 |

Fig.19

| SWITCHING | FREQUENCY | |
| --- | --- | --- |
| | SERIALS | GROUP-SERIALS |
| $\Delta 1 \rightarrow \Delta 2$ | BELOW ($\alpha 1/S$) | ABOVE ($\beta 1/S$) |
| $\Delta 2 \rightarrow \Delta 1$ | ABOVE ($\alpha 2/S$) | BELOW ($\beta 2/S$) |

5,924,043

METHOD AND APPARATUS FOR CONTROLLING TRANSMISSION POWER IN A CELLULAR MOBILE COMMUNICATION SYSTEM

BACKGROUND OF THE INVENTION

1. Field of the Invention

The present invention relates to terrestrial cellular mobile communication systems. More specifically, the present invention relates to a method and apparatus for controlling transmission power in a code division multiple access (CDMA) cellular mobile communication system.

2. Description of the Related Art

Transmission power control using CDMA techniques in terrestrial cellular mobile communications is disclosed, for example, in International Publication No. WO91/07037, and Japanese Unexamined Patent Publication No. 7-283783. Such a CDMA-based transmission power control, however, poses a problem of distance variation among mobile units using the same base station in the cellular mobile communication system. In such a situation that one mobile unit may be located at a quite long distance from the base station while another mobile unit may be located very near, the base station receives signal power at a higher level from the mobile unit very near. Signal power at such a higher level received from a shorter distance interferes with the base station receiving signal power from other mobile units located at longer distances. A more sophisticated control technique of transmission power is urgently needed for realizing the equal level of transmission power received at the base station from each one of mobile units sharing the same base station in the cellular mobile communication system, which is essential to solve the distance variation problem and to increase in-system user capacity.

The CDMA cellular mobile communication system poses another problem of system interference. When the base station controls the transmission power of a mobile unit during communication so that the base station can receive signal power from other mobile units at an equal level, nevertheless, interference occurs due to the common frequency assigned to all mobile users in the communication system sharing the same base station with other users who may be communicating at the same time. Interference is closely related to the quality of communication in cellular mobile communication system. In order to avoid such interference, the base station tries to transmit power to each mobile unit at a minimum level required for maintaining quality communication, in terms of increasing the system user capacity. Such a CDMA-based transmission power control involves an open loop control system through the local assumption of transmission power at each mobile unit and a closed loop control system through a command from the base station for adjusting and fine tuning the transmission power at the mobile unit.

FIG. 29 shows a block diagram of the related art transmission power control apparatus, incorporated in a closed loop control system of transmission power between a base station 101 and a mobile unit 102 in the CDMA cellular mobile communication system. At the mobile unit 102, transmission power is controlled locally through the open loop control system, which is not shown here. The base station 101 generates a transmission power control command signal, which is abbreviated to TPC bit, based upon transmission power received from the mobile unit 102 and transmits the TPC bit to the mobile unit. The transmission power received at the base station is converted to Signal-to-Interference Ratio, which is abbreviated to Receive (REC.) SIR, through conventional conversion techniques which are not shown or discussed here.

The TPC bit is generated at the base station 101 as follows. An adder 103 subtracts the Receive SIR (in dB) from a predetermined Reference Signal-to-Interference Ratio REF. SIR (in dB) to calculate a difference as a power control error $\epsilon$ (in dB) and outputs the power control error $\epsilon$ to a judger 104. The judger 104 judges a value ($\pm$) corresponding to the sign of the power control error $\epsilon$ and generates the value as the TPC bit. When Reference (REF.) SIR>Receive (REC.) SIR, for example, the judger 104 outputs a TPC-bit value (+1) requesting the mobile unit 102 to raise the power level for transmission. When Reference SIR$\leq$Receive SIR, the TPC-bit value (−1) is outputted requesting to lower the transmission power level. The TPC bit is a one-bit command signal ($\pm 1$) having the significance in the sign ($\pm$). The one-bit command signal of the TPC bit is transmitted through a multiplex technique on a traffic channel to a mobile unit at a transmission rate of some hundreds to thousands bits per second. The values of TPC bit, +1 and −1, are in fact converted to 0 and 1, respectively, for transmission.

Upon reception of the TPC bit from the base station 101 through the closed loop control system, the mobile unit 102 increase or reduces transmission power based upon the TPC bit using a predetermined fixed step size $\Delta$ (in dB), 1 dB for example. Specifically, the TPC bit multiplexed on a traffic channel is extracted. The TPC-bit value ($\pm 1$) is amplified or multiplied by $\Delta$ by an amplifier 105 to become $+\Delta$ (in dB) with a command signal (+1) and $-\Delta$ (in dB) with a command signal (−1). The amplified result is integrated in an integration circuit including an adder 106 and a delay circuit 107 with previous values of the TPC bit. With a series of values of TPC bits like (+1, +1, +1, +1, −1, +1, −1, −1) when an initial value 0 (in dB) is assigned to the delay circuit 107, the adder 106 outputs an integrated result of ($+\Delta$, $+2\Delta$, $+3\Delta$, $+4\Delta$, $+3\Delta$, $+4\Delta$, $+3\Delta$, $+2\Delta$). The integrated results of controlled power through the closed loop control system are added to optimal power assumed in the open loop control system, not shown. Thus, the mobile unit 102 transmits adjusted power through the closed and open loop systems to the base station 101.

Power control delay may occur in the closed loop control system depending upon the location of the mobile unit 102 including the delay resulting from the TPC bit travelling from the base station 101 to the mobile unit 102, the TPC bit adjusting transmission power, and the adjusted transmission power travelling from the mobile unit 102 to the base station 101.

FIG. 30 shows a graph of a power variation characteristic of transmission power received at the base station 101, illustrating a desired type of power variation involving no power control delay in the closed loop control system. The graph is drawn with a time variation t as the horizontal scale indicating each periodical term of TPC bit to be outputted, abbreviated to a TPC period T, and with dB of Receive SIR at the base station 101 of transmission power from the mobile unit 102 as the vertical scale indicating each step size $\Delta$ when the value of Reference SIR is set to zero. Referring to the graph, TPC bits 501 through 504 are generated, respectively, based upon Receive SIR values (in dB) 401 through 404 at the base station 101. The values of Receive SIR remain within a desired range of $\pm\Delta$ with the reference value zero when transmission power varies within 1$\Delta$ in a single TPC period of 1T. Specifically, with Receive SIR 401<0, a value (+1) is assigned to TPC bit 501, whereby Receive SIR 402 is increased by approximately Δ from Receive SIR 401. With Receive SIR 402≧0, a value (−) is assigned to TPC bit 502, whereby Receive SIR 403 is reduced by approximately Δ from Receive SIR 402. In such a manner, transmission power of a mobile unit is adjusted desirably based upon a TPC bit when involving no power control delay.

FIG. 31 shows a graph of a power variation characteristic of transmission power received at the base station involving the power control delay of 1T, illustrating poor performance of transmission power control in the same graph structure as that of FIG. 30. According to the graph of FIG. 31 involving the power control delay of 1T, the values of Receive SIR range between ±2Δ with the reference value zero when transmission power moves only within 1Δ in a single TPC period of 1T. This illustrates that there is a time lag of 1T between a generated and transmitted TPC bit and Receive SIR of transmission power to be adjusted based upon the TPC bit due to the power control delay of 1T in the closed loop control system. Referring to the graph, TPC bits 511 through 514 are generated based upon Receive SIR values 411 through 414. Specifically, with Receive SIR 411<0, a value (+1) is assigned to TPC bit 511. With a value (+1) of the previous TPC bit 510, Receive SIR 412 is increased by approximately Δ from Receive SIR 411. With Receive SIR 412≧0, a value (−1) is assigned to TPC bit 512. With the previous TPC bit 511 (+1), Receive SIR 413 is increased by approximately Δ from Receive SIR 412. With receive 413≧0, a value (−1) is assigned to TPC bit 513. With the previous TPC 512 (−1), Receive SIR 414 is reduced by approximately Δ from Receive SIR 413. Transmission power of the mobile unit is adjusted in such a poor manner resulting in transmission power ranging ±2Δ with the power control delay of 1T.

Thus, the power control delay in the closed loop control system delays the TPC bit to adjust transmission power at the mobile unit, which ends up in poor power control. With the power control delay of 2T or more, therefore, the transmission power range will be much greater.

The transmission power control apparatus of FIG. 29, therefore, poses some problems as follows. With received channel power level changing little, nevertheless, transmission power received at the base station varies greatly by a parasitic effect due to a power control delay of more than 1T. Consequently, power control error becomes greater, which results in reduced system user capacity.

Another problem concerns the fixed step size Δ for power adjustment. The fixed step size may not be suitable in some cases depending upon the motion speed of a mobile unit. Power control error may increase which also leads to reduced system user capacity.

FIG. 32 shows a graph of control error characteristics of transmission power involving the power control delay of 1T, illustrating an fDT as the horizontal scale and a standard deviation σ of transmission power control error as the vertical scale. With fDT, fD stands for a Doppler frequency and T stands for the TPC period. Doppler frequency corresponds to the motion speed of a mobile unit. With transmit frequency in the band of 1 GHz and a motion speed of the mobile unit at 100 km/h, for example, Doppler frequency fD is 90 Hz. Therefore, fDT=0.1 with a single TPC period T of 1.1 kbps, for example. The graph includes a characteristic curve A of control error having a step size Δ1 and a characteristic curve B of control error having a step size Δ2. Step size Δ1 is smaller than step size Δ2 in such a relation, for example, that Δ2=2 dB when Δ1=1 dB. There is a crossing point of characteristic curves A (Δ1=1 dB) and B (Δ2=2 dB) when fDT=0.01. This indicates that characteristic A (Δ1=1 dB) has less control error of transmission power when fDT≦0.01, and characteristic B (Δ=Δ2 dB) has less control error of transmission power when fDT>0.01.

Still another problem exists concerning the transmission power control command. The transmission power control apparatus proposes another type of control command signal using a multi-bit command signal as an alternative of the single bit control command signal of the TPC bit. A multi-bit signal transmission, however, poses another problem concerning the greater number of TPC bits in transmission rate required from the base station to each mobile unit.

Yet another problem concerns system interference. The fixed step size Δ is the only way to account for a possible sudden and sharp movement in channel power. The step size is not appropriate enough to control such an emergency situation and might leave interference out of control.

FIG. 33 shows a graph of a power variation characteristic of transmission power received at the base station involving a power control delay of 1T. The graph is drawn with time variation t as the horizontal scale and with dB of the Receive SIR of transmission power from the mobile unit received at the base station. Referring to FIG. 33, a fading-related fall and a great system interference occurring in Receive SIR designated by a solid line 602 is shown as a result of the poor control of transmission power from a mobile unit of a great increase in channel power designated by a broken line 601 of transmission power. Troublesome system interference may occur when a change in channel power goes far beyond power control based upon Receive SIR at the base station. Specifically, system interference occurs in the following manner with FIG. 33. With a great fall in Receive SIR due to the fading effect, the base station continuously generates an increase command (+1) of the TPC bit in order to increase transmission power of the mobile unit to recover the normal power. As a result, when Receive SIR recovers from the fading-related fall and transmission power reaches a high enough power level, nonetheless, the value of transmission power does not come down to a predetermined value or below. This is caused by the step size Δ being too small to cope with such a change in transmission power and by the power control delay.

SUMMARY OF THE INVENTION

Thus, a primary objective of the present invention is to improve power control performance of transmission power of a mobile unit implemented in a closed loop control system involving power control delay in a cellular mobile communication system. The objective is to increase system channel/user capacity through the resolution of the distance variation problem. The objective is achieved through the reduction of power control error of transmission power poorly adjusted for the mobile unit received at the base station due to the power control delay. A power control error reduction should then be achieved through the predictive approach of transmission power to be adjusted based upon a TPC bit at the mobile unit involving the feedback of the TPC bit during the power control delay. The objective is also achieved through the detection of the motion speed of a mobile unit in order to select an optimal step size.

These and other objects are accomplished by the present invention as hereinafter described in further detail.

According to one aspect of the present invention, a power control apparatus, controlling transmission power of a mobile unit communicating with a base station, may include a command generator for generating a transmission power control command based upon the transmission power received from the mobile unit and transmitting the transmission power control command to the mobile unit, the transmission power control command controlling the transmission power, and a transmit power controller for receiving the transmission power control command and controlling the transmission power based upon a received transmission power control command, wherein the command generator generates the transmission power control command based upon the transmission power received and the transmission power control command generated and transmitted to the mobile unit.

According to another aspect of the present invention, a power control apparatus, controlling transmission power of a mobile unit communicating with a base station, may include a command generator for generating a transmission power control command based upon the transmission power received from the mobile unit and transmitting the transmission power control command to the mobile unit, the transmission power control command controlling the transmission power, and a transmit power controller for receiving the transmission power control command and controlling the transmission power based upon a received transmission power control command, wherein the transmit power controller varies the transmission power by implementing first and second step sizes and controls the transmission power by adaptively switching the first and second step sizes.

According to another aspect of the present invention, a power control apparatus, controlling transmission power of a mobile unit communicating with a base station, may include a command generator for generating a transmission power control command based upon the transmission power received from the mobile unit and transmitting the transmission power control command to the mobile unit, the transmission power control command controlling the transmission power, and a transmit power controller for receiving the transmission power control command and controlling the transmission power based upon a received transmission power control command, wherein the transmit power controller includes a power level setter for resetting a power level of the transmission power to a mean value of previous values of the transmission power output by the mobile unit.

According to another aspect of the present invention, a method for controlling transmission power of a mobile unit communicating with a base station may include the steps of retaining a power control command at the base station during a first power control delay and outputting a first delayed transmission power control command after the first power control delay, amplifying the first delayed transmission power control command by a step size and outputting a first amplified power adjusting a power control error based upon the first amplified power and outputting an adjusted power control error, and judging the adjusted power control error and generating an updated transmission power control command.

According to another aspect of the present invention, a power control apparatus for a base station may include a command generator for generating a transmission power control command based upon a transmission power received from a mobile unit and a previous transmission power control command generated and transmitted to the mobile unit and transmitting the transmission power control command to the mobile unit, the transmission power control command controlling the transmission power of the mobile unit.

According to another aspect of the present invention, a power control apparatus for a base station may include a command generator for generating a transmission power control command based upon a transmission power received from a mobile unit, and transmitting the transmission power control command to the mobile unit, the transmission power control command controlling the transmission power of the mobile unit, wherein the mobile unit varies the transmission power by implementing first and second step sizes and controls the transmission power by adaptively switching the first and second step sizes.

According to another aspect of the present invention, a power control apparatus for a base station may include a command generator for generating a transmission power control command based upon a transmission power received from a mobile unit, and transmitting the transmission power control command to the mobile unit, the transmission power control command controlling the transmission power of the mobile unit, wherein the mobile unit resets a power level of the transmission power to a mean value of previous values of the transmission power output by the mobile unit.

According to another aspect of the present invention, a method for controlling transmission power may include the steps of retaining a transmission power control command at a base station during a power control delay and outputting a delayed transmission power control command, after the power control delay, to a mobile unit, amplifying the delayed transmission power control command by a step size and outputting an amplified power, adjusting a power control error based upon the amplified power and outputting an adjusted power control error, and judging the adjusted power control error and generating and transmitting an updated transmission power control command to the mobile unit.

According to another aspect of the present invention, a power control apparatus for a mobile unit may include a transmit power controller for receiving a transmission power control command from a base station, which generated the transmission power control command based upon a transmission power received from the mobile unit and a previous transmission power control command generated and transmitted to the mobile unit and controlling the transmission power of the mobile unit based upon the received transmission power control command.

According to another aspect of the present invention, a power control apparatus for a mobile unit may include a transmit power controller for receiving a transmission power control command from a base station, which generated the transmission power control command based upon a transmission power received from the mobile unit and controlling the transmission power of the mobile unit based upon the received transmission power control command, wherein the transmit power controller varies the transmission power by implementing first and second step sizes and controls the transmission power by adaptively switching the first and second step sizes.

According to another aspect of the present invention, a power control apparatus for a mobile unit may include a transmit power controller for receiving a transmission power control command from a base station, which generated the transmission power control command based upon a transmission power received from the mobile unit and controlling the transmission power based upon the received transmission power control command, the transmit power controller including a power level setter for resetting a power level of the transmission power to a mean value of previous values of the transmission power output by the mobile unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 12 illustrates the count and frequency of the serials of the TPC-bit sample of FIG. 11;

FIG. 14 illustrates the count and frequency of the group-serials of TPC bits of the three different types of group-serials counting of FIG. 13;

FIG. 19 shows a table illustrating a switching guideline of step size according to the present invention;

DETAILED DESCRIPTION OF THE PREFERRED EMBODIMENTS

Figure 1:
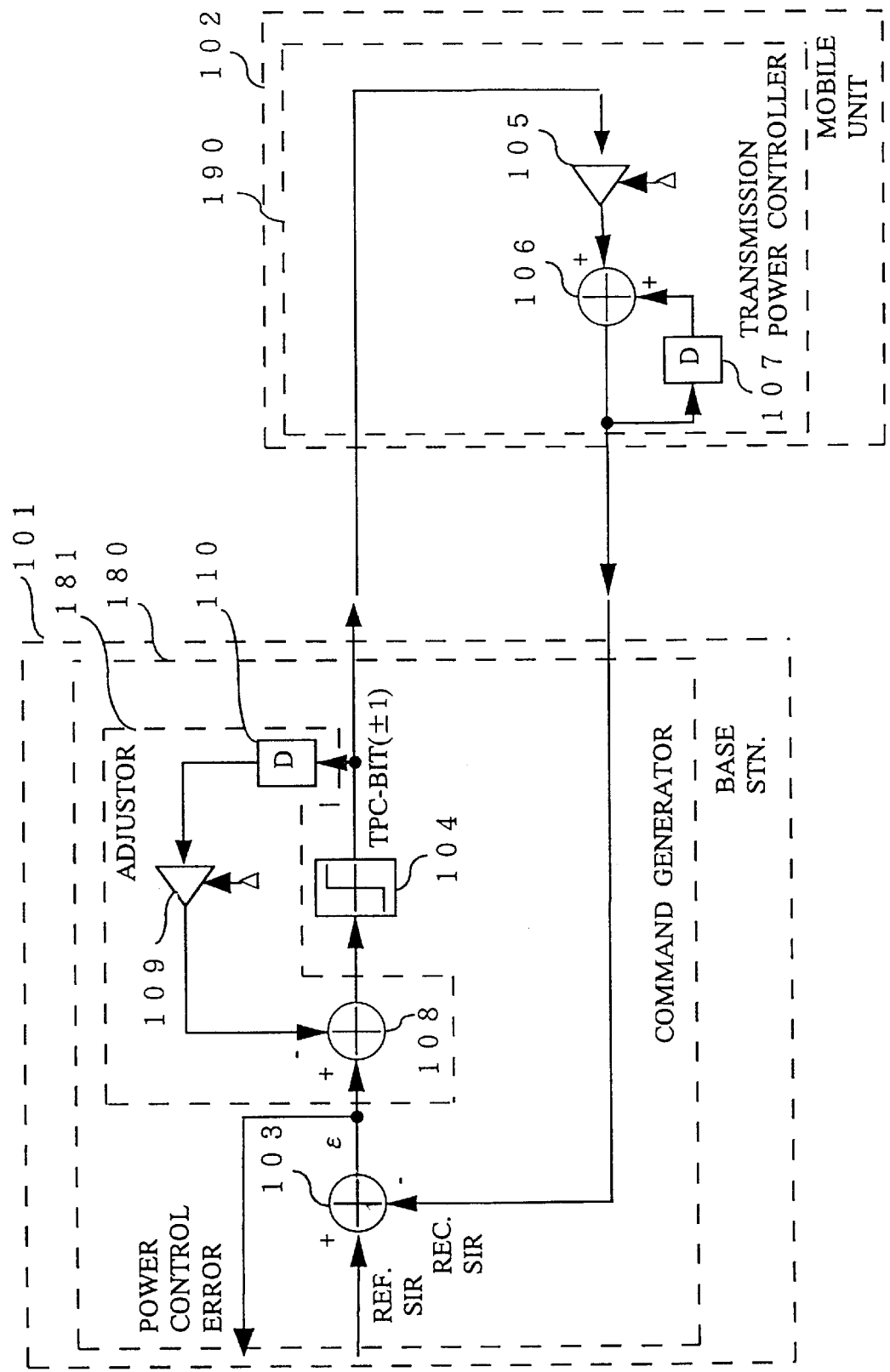
FIG. 1 shows a block diagram of a transmission power control apparatus according to a first embodiment of the present invention.

Reference will now be made in detail to the present preferred embodiments of the invention, examples of which are illustrated in the accompanying drawings, wherein like reference numerals indicate like elements through out the several views.

Embodiment 1.

FIG. 1 shows a block diagram of a transmission power control apparatus according to a first embodiment of the present invention, which is incorporated in a closed loop control system of transmission power between a base station 101 and a mobile unit 102 in a cellular mobile communication system. Transmission power is also controlled locally at the mobile unit 102 through an open loop control system, which is not shown here. Transmission power is converted at the base station 101 to Signal-to-Interference Ratio, which is abbreviated to Receive (REC.) SIR, through conventional conversion techniques which are not shown or discussed here.

Power control delay may occur in the closed loop control system as a result of the TPC bit travelling from the base station 101 to the mobile unit 102, and the TPC bit adjusting transmission power and adjusted transmission power travelling from the mobile unit 102 to the base station 101. A power control delay time is assigned here with a single TPC period of 1T, with T designated as the period of a transmission power control command signal or TPC bit to be generated and outputted from the base station 101.

Referring to FIG. 1, the transmission power control apparatus includes a command generator 180 at the base station 101 for generating and outputting the TPC bit for adjusting transmission power at the mobile unit 102 based upon adjusted transmission power received from the mobile unit 102. The command generator 180 generates a quality TPC bit based both upon received transmission power adjusted at the mobile unit 102 based upon the previous TPC bit and a currently generated TPC bit, or current TPC bit, to be transmitted to the mobile unit 102. The command generator 180 includes an adder 103, an adjuster 181, and a judger 104. The adder 103 receives as an input Receive SIR of transmission power and a Reference (REF.) SIR of a predetermined reference power to calculate a difference and outputs the difference as a power control error $\epsilon$. The adjuster 181, having a feedback function of the TPC bit currently generated, adjusts the power control error $\epsilon$ during the power control delay so as to generate an updated or appropriate TPC bit for transmission power which should be adjusted based upon the currently generated TPC bit at the mobile unit 102 through a predictive approach of transmission power. The judger 104 judges a required state of transmission power to be adjusted based upon an adjusted power control error through the predictive approach and generates a command signal to increase or decrease ($\pm 1$) the TPC bit. The adjuster 181 includes an adder 108, an amplifier 109 and a delay circuit 110 in the TPC bit feedback loop. The delay circuit 110 inputs the TPC bit ($\pm 1$) currently generated in the judger 104, holds it during the power control delay (1T), and outputs the TPC bit to the amplifier 109. The amplifier 109 receives the TPC bit, generates the same additional amount of power as that of transmission power adjusted based upon the same TPC bit at the mobile unit 102, and outputs the additional amount of power. Specifically, the amplifier 109 amplifies a TPC bit ($\pm 1$) by $\Delta$ times and outputs an additional amount of power $+\Delta/-\Delta$. The adder 108 adds the additional amount of power outputted from the amplifier 109 to the transmission power control error e outputted from the adder 103. An adjusted power control error is supplied to the judger 104 for generating a quality TPC bit applying to transmission power control involving the power control delay of 1T.

The mobile unit 102 is provided with a transmit power controller 190 for receiving a TPC bit from the base station 101 and adjusting transmission power based upon the TPC bit.

Figure 2:
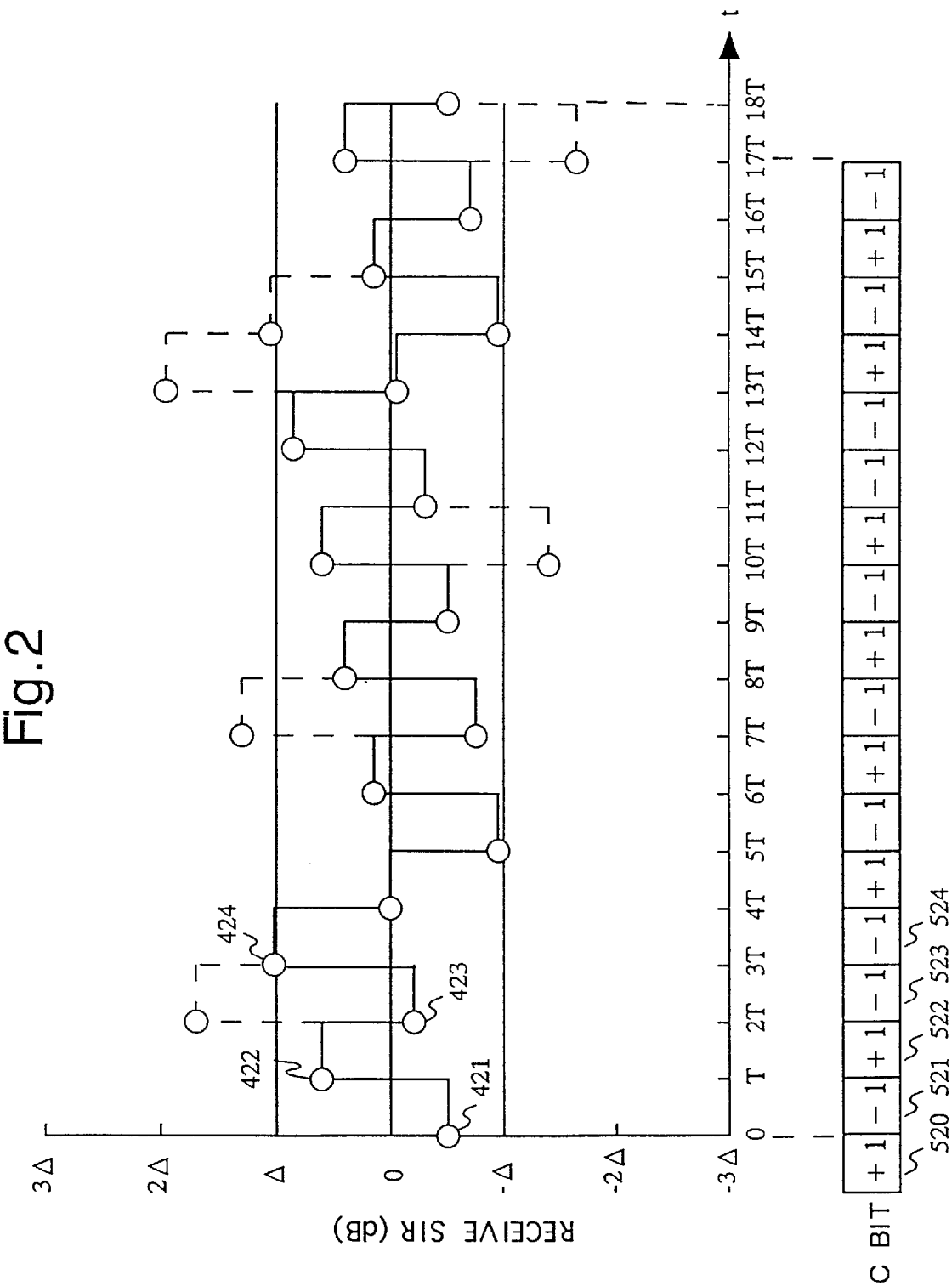
FIG. 2 shows a graph of a power variation characteristic of transmission power received at the base station with a power control delay of 1T according to the transmission power control apparatus of FIG. 1.
Figure 3:
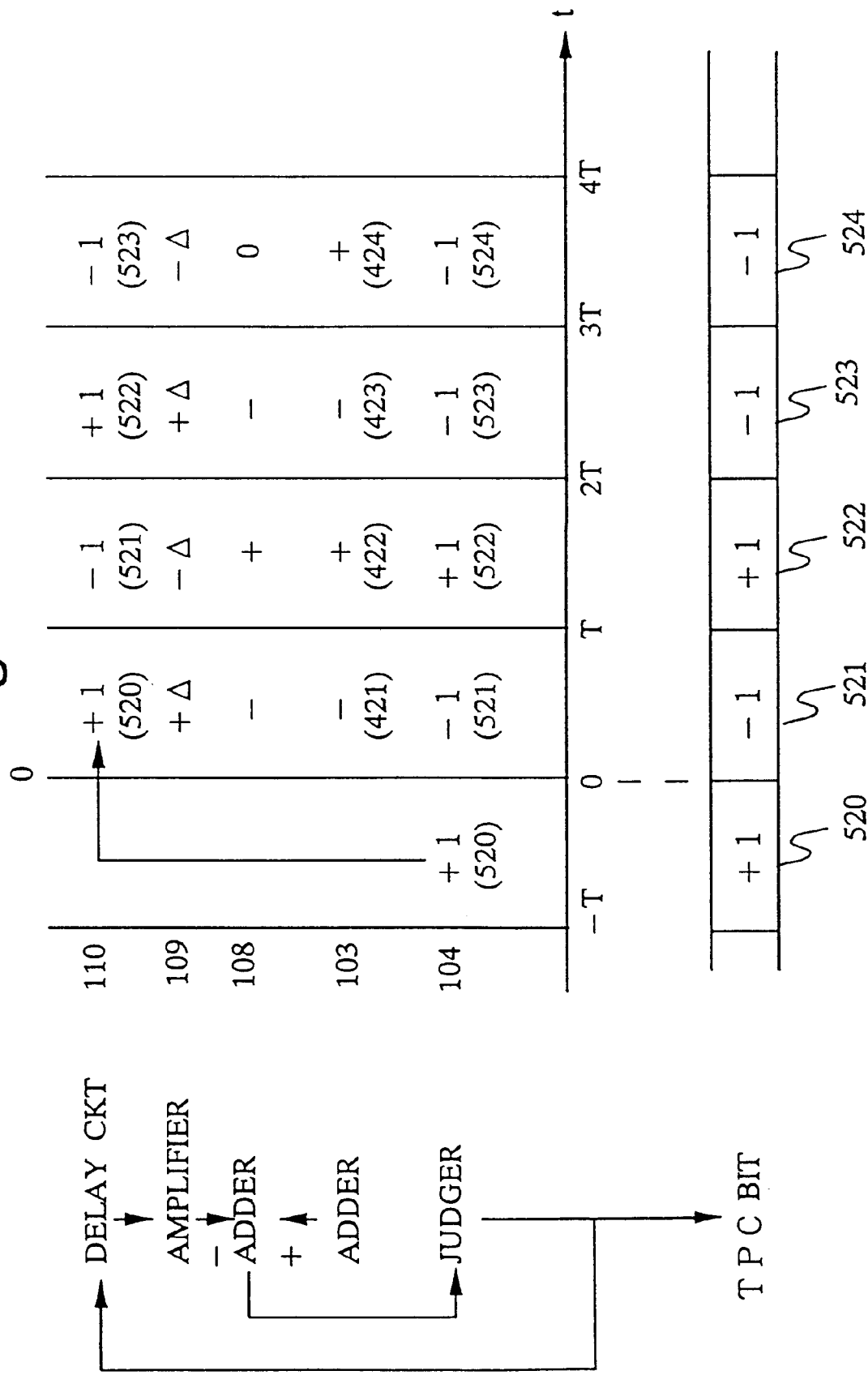
FIG. 3 illustrates the TPC-bit generation according to the first embodiment.

The predictive power control approach involving the TPC bit feedback loop of this embodiment is now discussed with reference to FIGS. 1 through 3. FIG. 2 shows a graph of a power variation characteristic of transmission power received at the base station 101 according to the transmission power control apparatus of FIG. 1, illustrating successful control of transmission power with transmission power ranges desirably within $\pm \Delta$ with a power control delay of 1T. FIG. 2 has a time variation t as the horizontal scale with each TPC period T and with dB of Receive SIR as the vertical scale with each step size $\Delta$ when the value of Reference SIR is set to zero. FIG. 2 shows successful transmission power control identified by a solid line including values of Receive SIR 421 through 424 in comparison with unsuccessful control by a broken line and corresponding TPC bits 521 through 524. The solid line proves that the controlled transmission power remains within the desired range of $\pm 1\Delta$. FIG. 3 illustrates TPC bit generation according to this embodiment.

With reference to FIGS. 2 and 3, TPC bit generation through the predictive power control approach involving the TPC-bit feedback loop is now discussed. TPC bit 520 (+1), generated based upon the previous Receive SIR, is input to the adjuster 181. TPC bit 520 (+1) is retained in the delay circuit 110 during the delay time of 1T before being supplied to the amplifier 109. The amplifier 109 amplifies TPC bit 520 (+1) by step size $\Delta$ and outputs an amplified result ($+\Delta$), which is supplied to the adder 108 when Receive SIR 421 (<0) of current power received at the base station 101 is supplied to the adder 108 through the adder 103. The amplified result is subtracted from the transmission power control error $\epsilon$ of Receive SIR 421 which is a subtracted result from the Reference SIR (0) in the adder 103. The judger 104 inputs a subtracted result from the adder 108 and generates TPC bit 521 ($-1$). TPC bit 521 ($-1$) is transmitted to the mobile unit 102 and at the same time input to the adjuster 181 for local prediction, when the base station 101 receives a new transmission power for Receive SIR 422. Receive SIR 422 ($\geq 0$) is based upon transmission power adjusted in the mobile unit 102 based upon TPC bit 520 (+1) through increase in the transmission power corresponding to Receive SIR 421 by approximately $\Delta$. Similarly, with Receive SIR 422 ($\geq 0$) and TPC bit 521 ($-1$), TPC bit 522 (+1) is generated. Receive SIR 423 is transmission power-adjusted based upon TPC bit 521 ($-1$) through a reduction in the transmission power corresponding to Receive SIR 422 by approximately $\Delta$. With Receive SIR 423 (<0) and TPC bit 522 (+1), TPC bit 523 ($-1$) is generated. TPC bit 522 (+1) adjusts the transmission power of the mobile unit 102, through increase in the transmission power corresponding to Receive SIR 423, by approximately $\Delta$ to produce adjusted transmission power corresponding to Receive SIR 424. The same operation is continued thereafter.

Thus, the TPC bit is generated desirably with the power control error adjusted through subtraction by an amplified result of a 1T delayed TPC bit multiplied by a step size through the TPC-bit feedback loop with a power control delay of 1T. This achieves successful power control of transmission power ranging desirably within $\pm \Delta$.

In the light of the failing result of transmission power control due to the power control delay in the closed loop control system, this invention implements effective predictive approach of controlling transmission power by implementing a TPC-bit feedback loop. Unacceptable power control of transmission power results from the fact that the base station receives transmission power being adjusted based upon a TPC bit currently generated and transmitted to the mobile unit only after the delay time of 1T, and therefore a TPC bit is generated based upon transmission power adjusted based upon a TPC bit generated and transmitted 1T previously. On the other hand, the predictive power control approach of this embodiment predicts transmission power to be adjusted based upon a TPC bit currently generated in the TPC-bit feedback loop with the TPC bit delayed in compliance with the delay time of 1T and used to predict transmission power. Consequently, transmission power is controlled through the subtraction of predicted power based upon the delayed TPC bit from transmission power received at the base station. This contributes greatly to the elimination of undesirable variation of transmission power caused by a parasitic effect due to the power control delay.

Embodiment 2.

Figure 4:
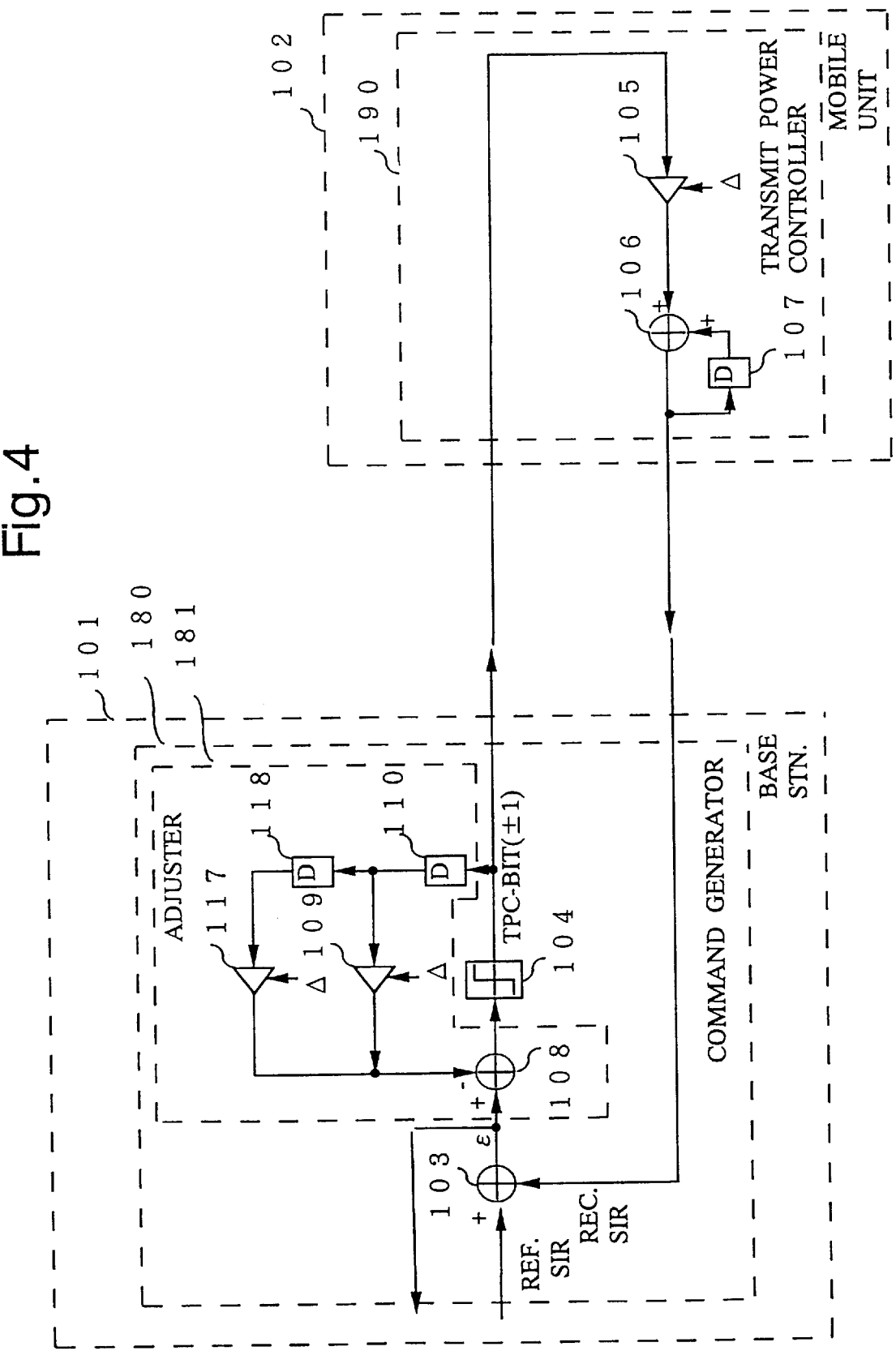
FIG. 4 shows a block diagram of a transmission power control apparatus according to a second embodiment of the present invention.
Figure 5:
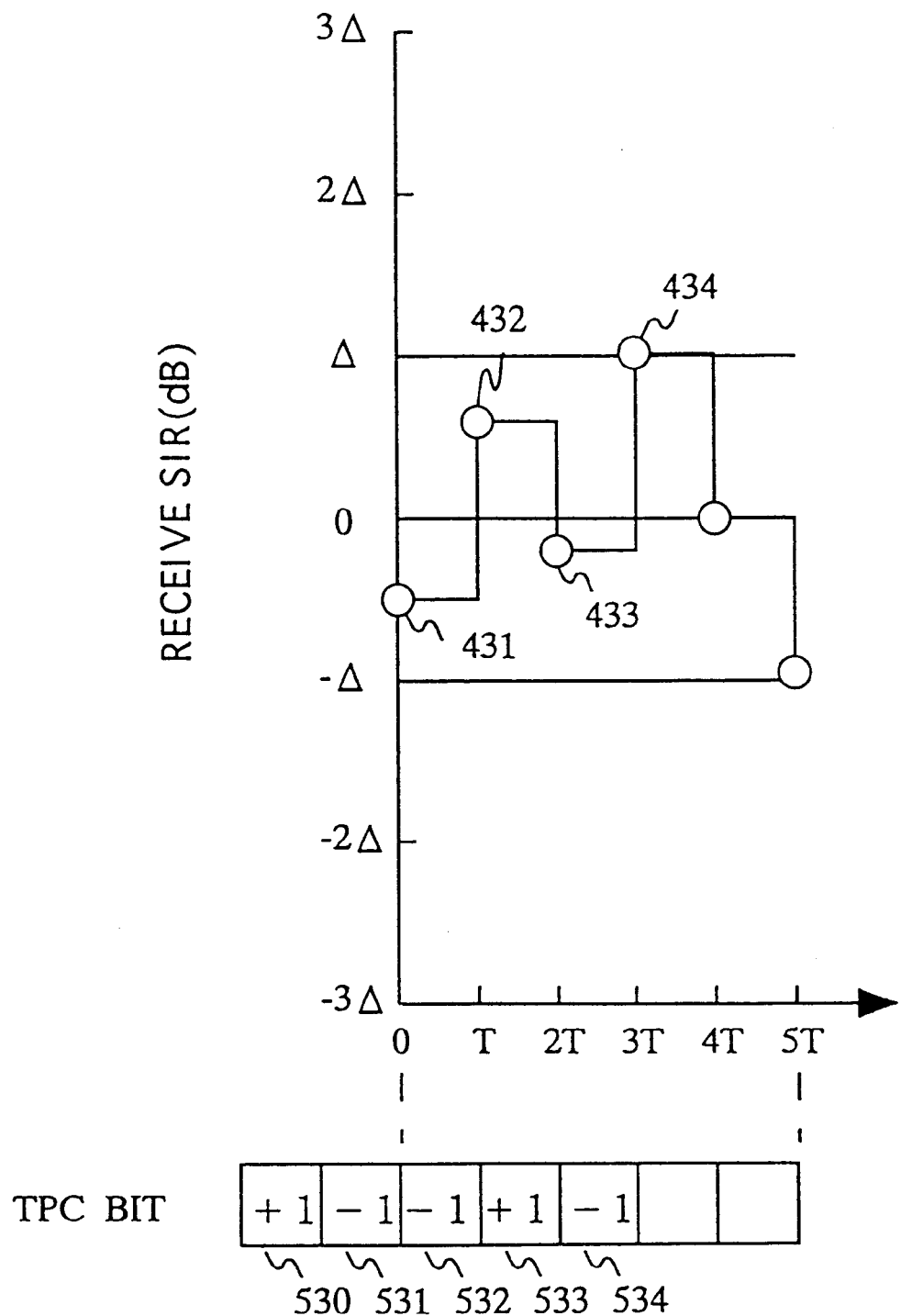
FIG. 5 shows a graph of a power variation characteristic of transmission power received at the base station with a power control delay of 2T according to the transmission power control apparatus of FIG. 4.
Figure 6:
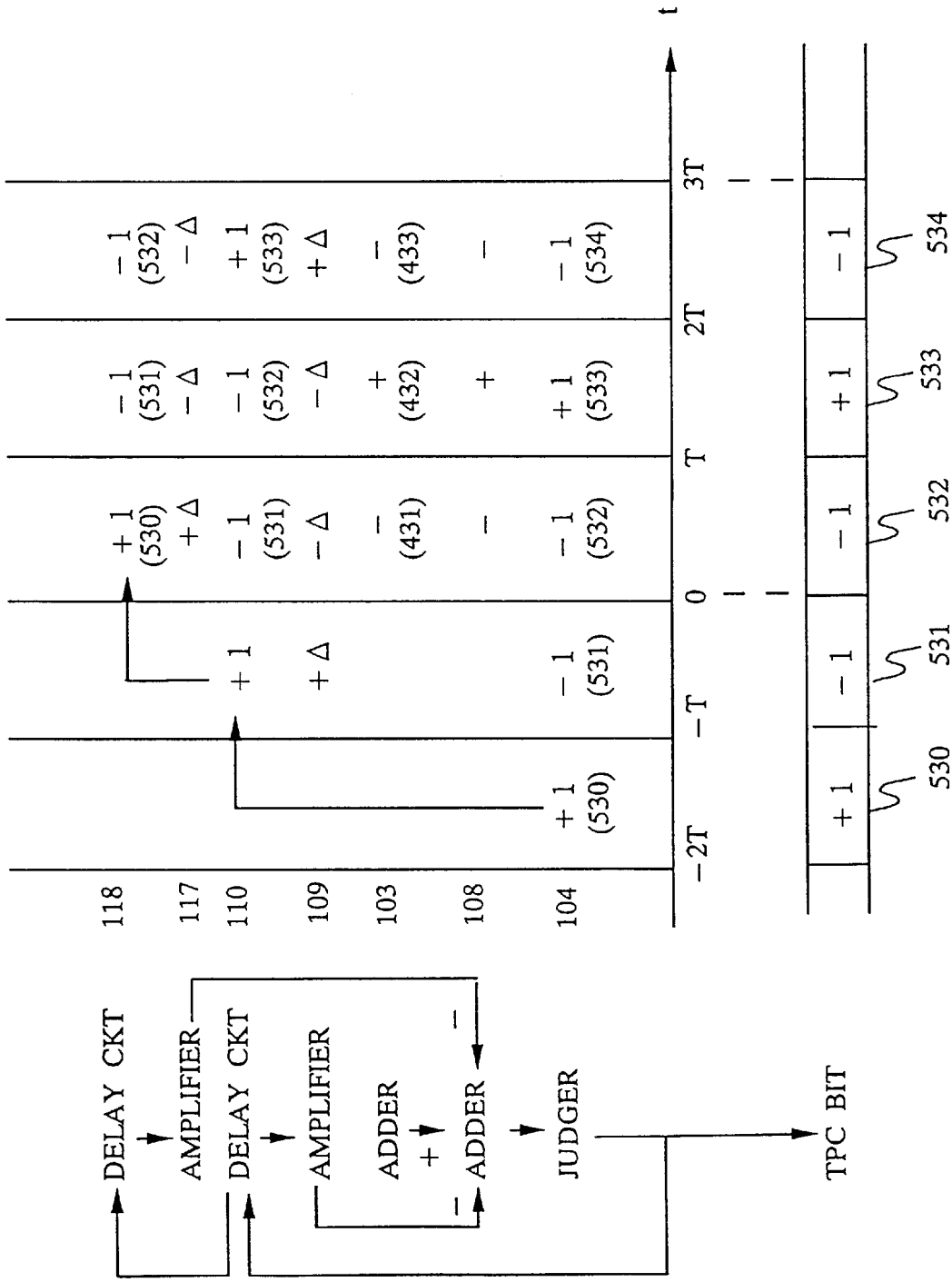
FIG. 6 illustrates the TPC bit generation according to the second embodiment.

FIG. 4 shows a block diagram of a transmission power control apparatus according to a second embodiment of the present invention with a power control delay of 2T. The transmission power control apparatus is incorporated in the closed loop control system of transmission power between the base station 101 and the mobile unit 102 in the cellular mobile communication system of FIG. 1. FIG. 5 shows a graph of a transmission power variation characteristic according to the transmission power control apparatus of FIG. 4, illustrating successful power control with transmission power remaining within the desired range with a power control delay of 2T. FIG. 6 illustrates TPC bit generation according to this embodiment.

The transmission power control apparatus of FIG. 4 has a delay circuit 118 and an amplifier 117 added to the adjuster 181 of the transmission power control apparatus of FIG. 1. The delay circuit 118 and amplifier 117 are placed between the delay circuit 110 and the adder 108 in parallel with delay circuit 110 and amplifier 109 in an adjuster 181 devoted to the control delay of 2T. The delay circuit 118 has the same function as that of the delay circuit 110 which holds a TPC bit during the delay time of 1T, and the amplifier 117 functions the same as that of the amplifier 109.

Referring to FIG. 4, the adjuster 181 inputs a TPC bit to the TPC-bit feedback loop and holds it in the delay circuit 110 during the delay time of 1T, and then the delay circuit 110 outputs the 1T delayed TPC bit to the amplifier 109 and also to the delay circuit 118, when the delay circuit 110 receives a next TPC bit from the judger 104 in the next TPC period. The delay circuit 118 holds the 1T delayed TPC bit during 1T and then outputs the 2T delayed TPC bit through the two delay circuits to the amplifier 117 for amplification similar to that of the amplifier 109 elaborated in the first embodiment. The amplified results of 1T and 2T delayed TPC bits outputted from the amplifiers 117 and 109 are both subject to subtraction in the adder 108 from the power control error Δ of Receive SIR outputted from the adder 103.

Thus, this embodiment is provided for solving the problem that the base station receives transmission power adjusted based upon a TPC bit currently generated and transmitted to the mobile unit only after the delay time of 2T with a power control delay of 2T in the closed loop control system. The inventive transmission power control apparatus predicts transmission power adjusted based upon the TPC bits generated and transmitted 1T and 2T before in the TPC-bit feedback loop to adjust power control error for generating a TPC bit. Specifically, in the TPC-bit feedback loop, a single TPC period or 1T delay should be offset through the set of delay circuit 110 and amplifier 109, and a second TPC period or 2T delay should be offset through the set of delay circuit 118 and amplifier 117. This achieves a successful power control with transmission power ranging desirably within ±Δ with a power control delay of 2T.

The same is true with the control delay of 3T in the system through the predictive approach of the present invention. Additional delay circuit and amplifier are then implemented to this predictive approach for eliminating a third previous TPC period delay in the same manner as that elaborated with this embodiment.

Embodiment 3.

Figure 7:
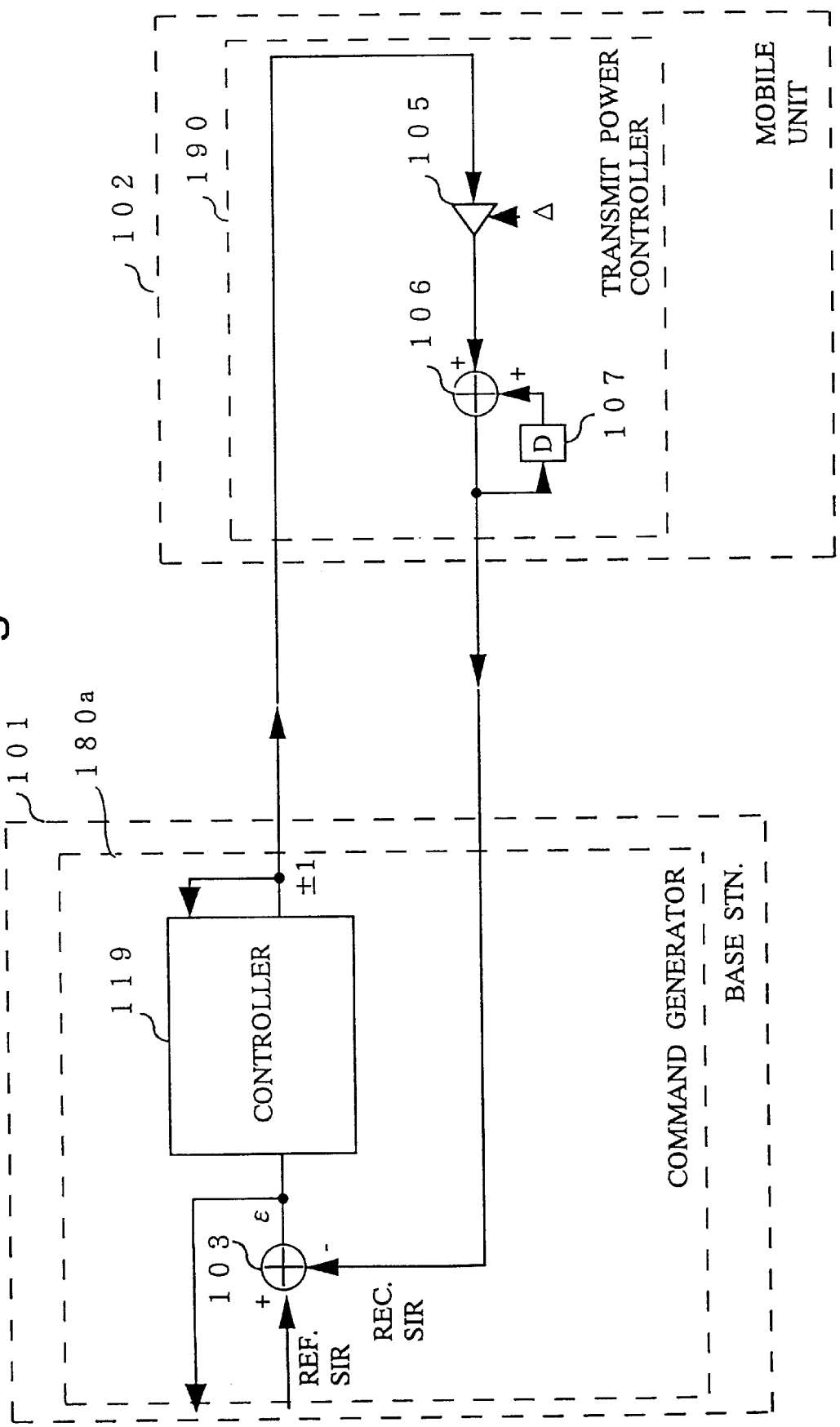
FIG. 7 shows a block diagram of a transmission power control apparatus according to a third embodiment of the present invention.

FIG. 7 shows a block diagram of a transmission power control apparatus according to a third embodiment of the present invention with a control delay of 1T in the closed loop control system in the cellular mobile communication system. This embodiment introduces another predictive approach of transmission power through the implementation of control algorithm rather than the circuitry of the first embodiment. The transmission power control apparatus of FIG. 7 replaces an algorithmic adjuster or controller 119 for the adjuster 181 of the transmission power control apparatus of FIG. 1 including the adder 108, amplifier 109, and delay circuit 110 and the judger 104.

Figure 8:
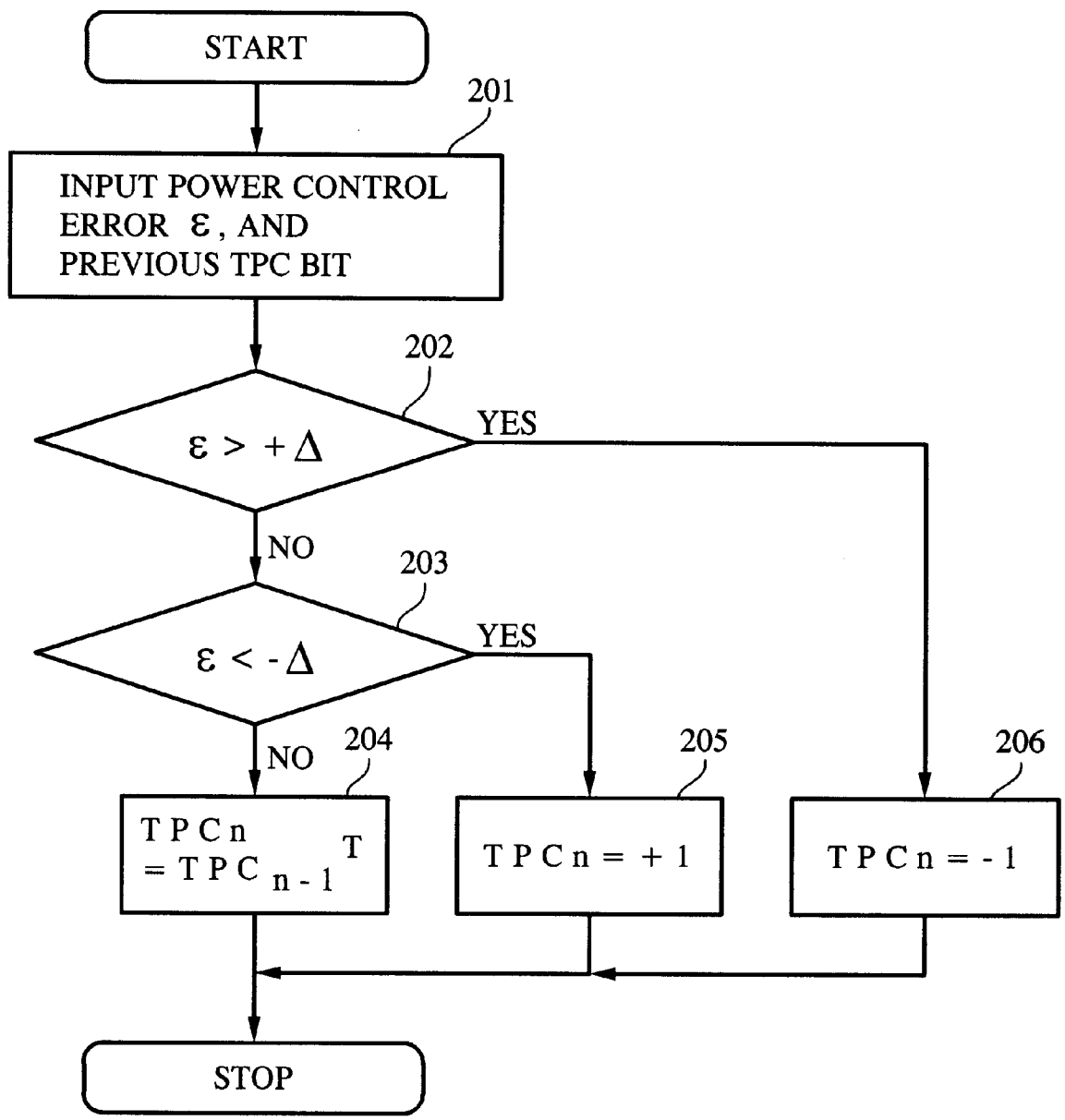
FIG. 8 shows a flowchart illustrating TPC generation steps performed by the algorithmic adjuster or control algorithm of FIG. 7.

FIG. 8 shows a flowchart illustrating the control algorithm performed in the algorithmic adjuster or controller 119. The legends and signs used in the flowchart of FIG. 8 include $\epsilon$ designating the power control error of Receive SIR subtracted from Reference SIR at the base station, $TPC_n$ designating a TPC bit currently generated, $TPC_{n-1}$ designating a TPC bit previously generated, and $TPC^T$ designating the sign (±) of TPC bit to be reversed. The algorithmic procedure of this embodiment is now described as follows, with reference to FIG. 8. In step 201, the controller 119 receives the power control error $\epsilon$ outputted from the adder 103 and a 1T delayed TPC bit (±) which was generated 1T before. In step 202, the power control error $\epsilon$ is compared with +Δ and judged which is greater. When the power control error $\epsilon$ is greater than +Δ ($\epsilon$>+Δ), then the flowchart proceeds to step 206 to set $TPC_n$=−1. When the power control error $\epsilon$ is not greater, then the flowchart proceeds to step 203 for a further judgement whether the power control error $\epsilon$ is less than −Δ ($\epsilon$<−Δ). If YES, then the flowchart proceeds to step 205 to set $TPC_n$=+1. If NO, then the flowchart proceeds to step 204 to set $TPC_n$=+$TPC_{n-1}^T$.

In other words, the algorithmic adjuster or controller 119 is provided with three types of algorithms: "$TPC_n$=+1" is performed when $\epsilon$<−Δ, which generates a current TPC bit (+1). "$TPC_n$=$TPC_{n-1}^T$" is performed when −Δ≦$\epsilon$≦Δ, which generates a current TPC bit (±1), that is, a value with the sign of the previous 1T delayed TPC bit being reversed. "$TPC_n$=−1" is performed when $\epsilon$>Δ, which generates a current TPC bit (−1). Through such an algorithmic predictive approach, an optimal value of TPC bit is judged in each of those cases and generated and transmitted to the mobile unit.

The instruction "$TPC_n$=$TPC_{n-1}^T$" of step 204 is provided for preventing adjacent TPC bits from having the same sign (±) with a power control delay of 1T. This is significant because when adjacent TPC bits have different signs, the influence of the previous TPC bit can be offset by the late TPC bit. This results in successful power control with transmission power ranging desirably within ±Δ.

When channel power varies slightly, the power control error is smaller, which increases channel capacity. On the other hand, when channel power varies greatly and sharply together with the power control delay of 1T in the closed loop control system, transmission power control should involve a time lag of 1T. This may increase power control error due to greater variation in channel power, theoretically, but in fact this matters little in a situation that a mobile unit is moving at a relatively slow speed and channel power rarely varies greater. If a mobile unit is moving at a relatively high speed, channel power may be controlled through conventional technologies including RAKE reception, space diversity, etc. to vary less. Thus, as a whole, the algorithmic predictive approach of transmission power control of this embodiment contributes greatly to the improvement of transmission power control error characteristic.

Figure 9:
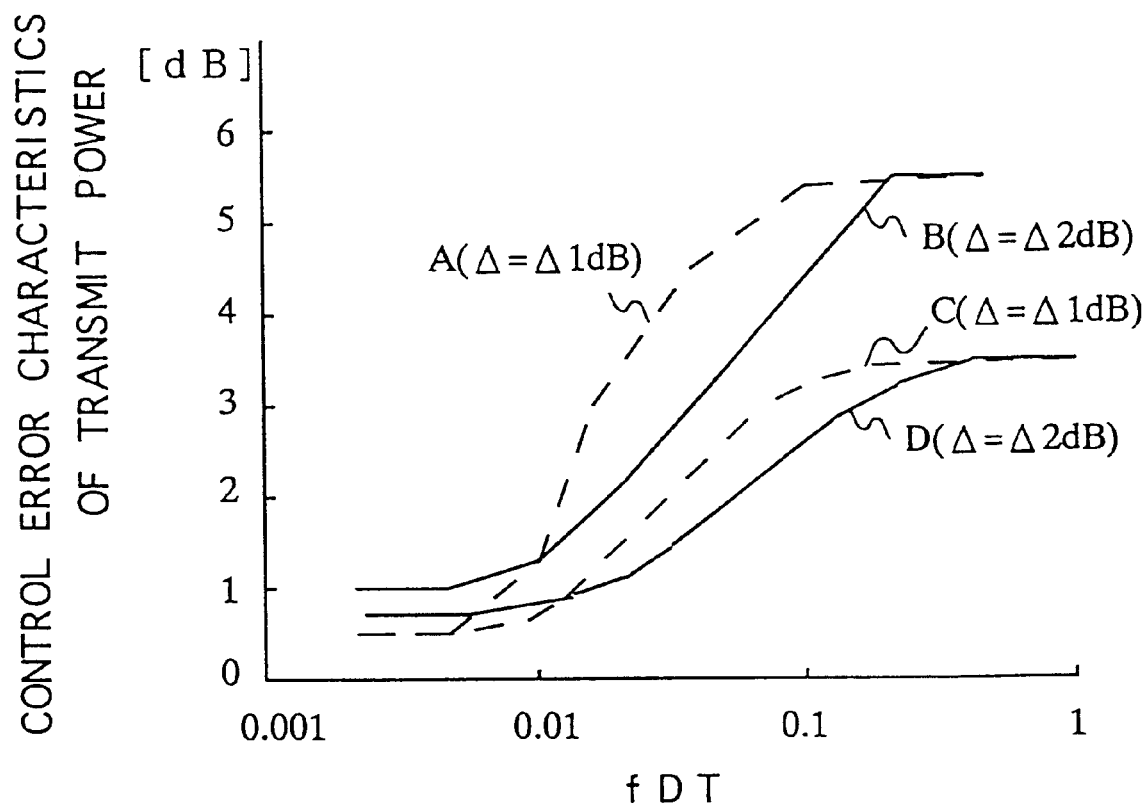
FIG. 9 shows a graph of transmission power control error characteristics according to the third embodiment.

FIG. 9 shows a graph of a transmission power control error characteristics according to this embodiment in comparison with those of the related art with values of the motion speed, fDT, of a mobile unit as the horizontal scale.

Figure 32:
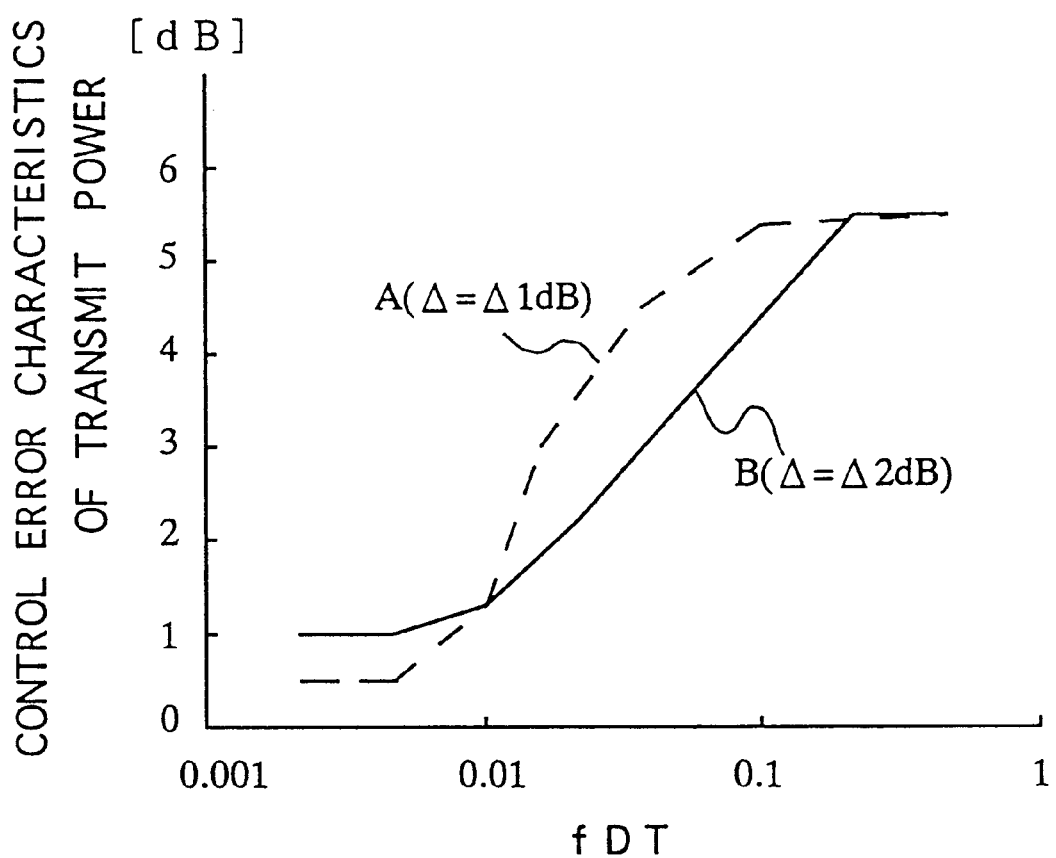
FIG. 32 shows a graph of a transmission power control error characteristic according to the transmission power control apparatus of FIG. 29.
Figure 33:
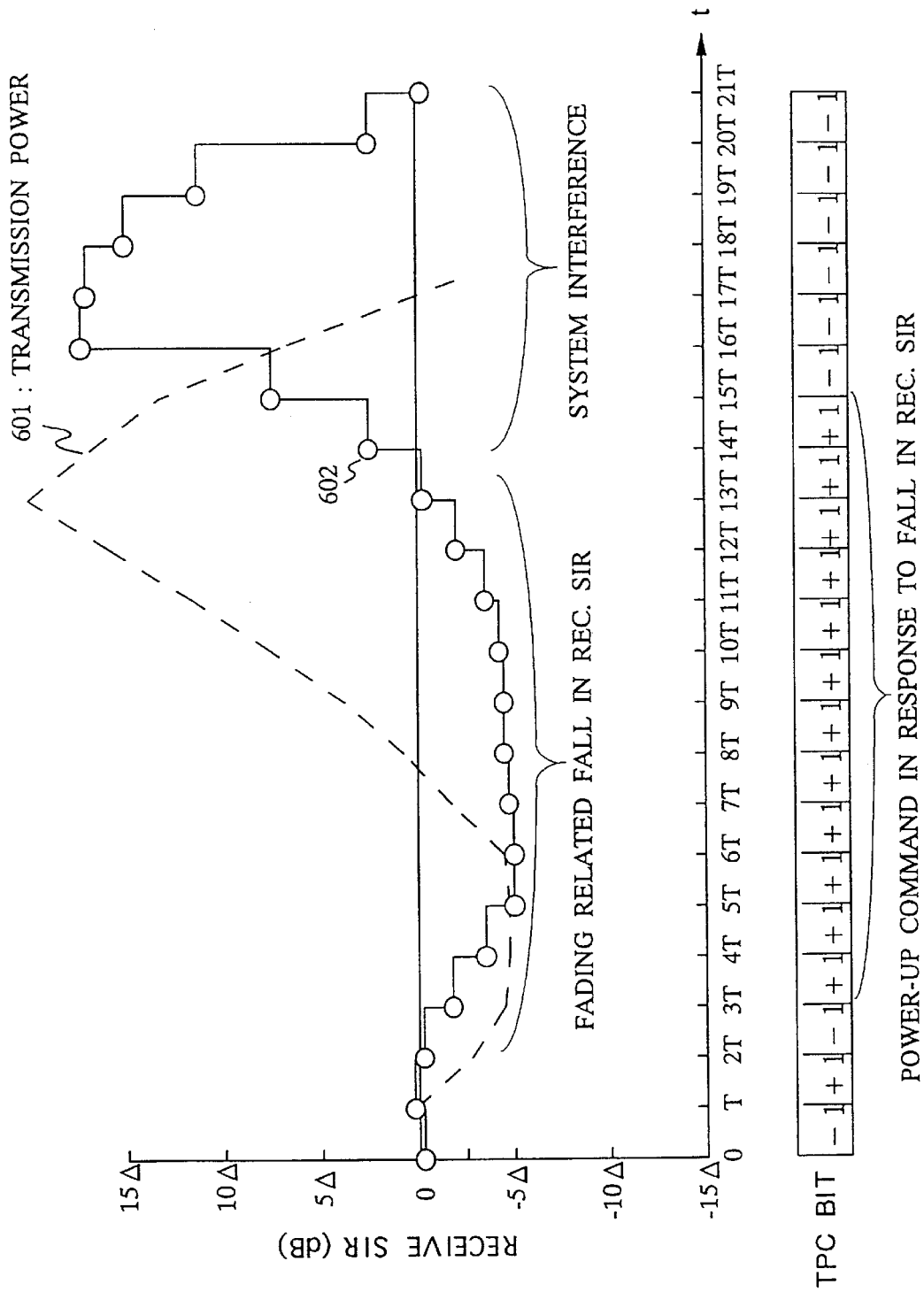
FIG. 33 shows a graph of a power variation characteristic of transmission power received at the base station with a power control delay of 1T according to the transmission power control apparatus of FIG. 29.

The graph shows control error characteristic curves C and D of transmission power control of this embodiment corresponding to control error characteristic curves A and B, respectively, of the prior art transmission power control of FIG. 32. FIG. 9 illustrates the great improvement in power control error characteristics through the algorithmic predictive approach of this embodiment.

Embodiment 4.

A fourth embodiment of the present invention introduces an improved transmission power control approach involving the detection of the motion speed, fDT, of a mobile unit and an optimal step size selection. The improved approach of this embodiment adds the fDT detection to the predictive power control approach of the first embodiment. According to this embodiment, an fDT is detected, for example, through comparison between a total number of received TPC bits averaged in a predetermined number and a reference value. The total number of averaged TPC bits may be counted, for example, in two ways: one is counting serials through which the number of TPC bits of the same sign (±) occurring in series is counted in the predetermined number of TPC bits, and the other is counting group-serials through which the number of TPC bits of the same sign (±) in groups of pairs, triplets, quadruplets, etc. occurring in series is counted in the predetermined number of TPC bits.

Figure 10:
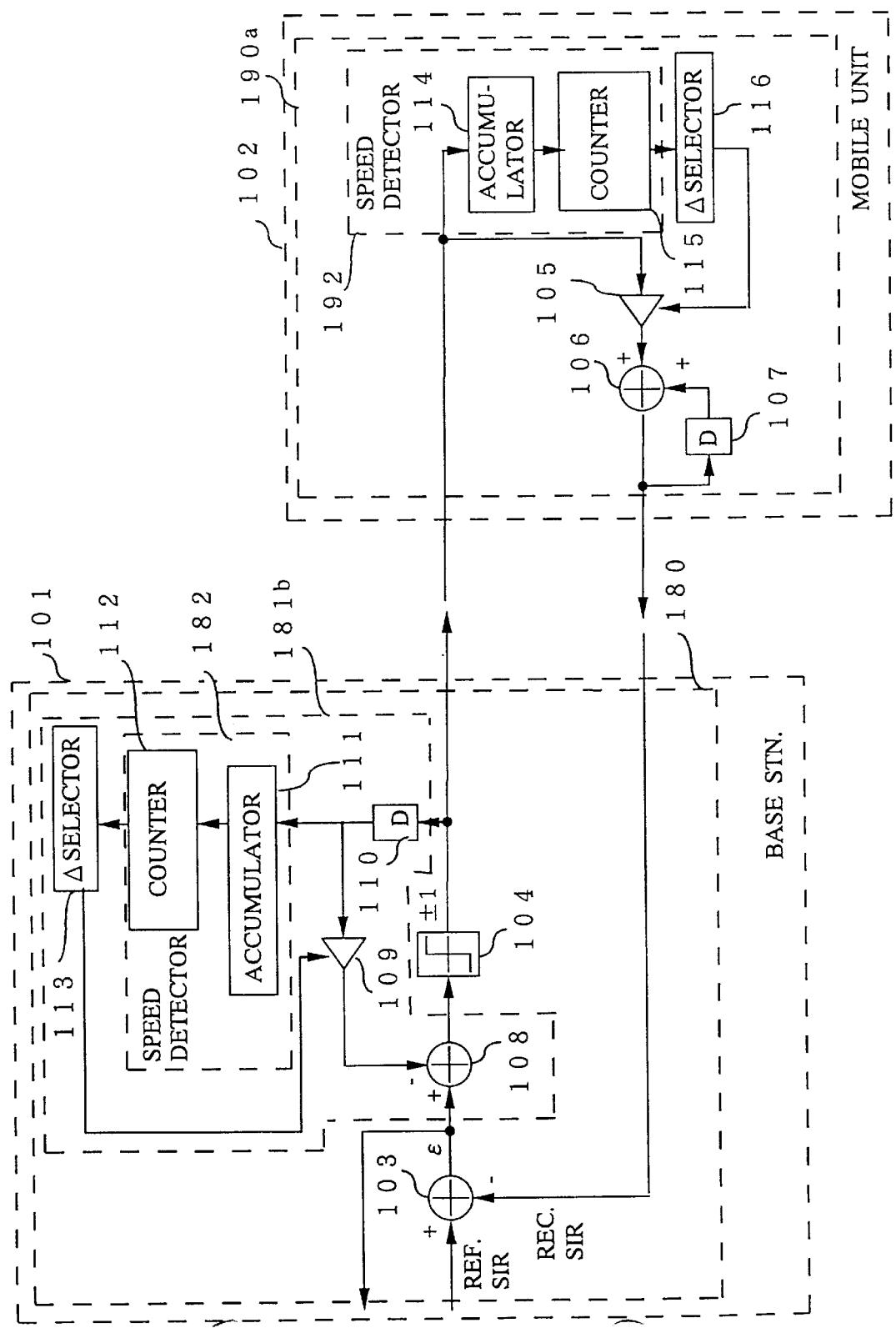
FIG. 10 shows a block diagram of a transmission power control apparatus according to a fourth embodiment of the present invention.

FIG. 10 shows a block diagram of a transmission power control apparatus of this embodiment implemented in the closed loop control system with a power control delay of 1T in the cellular mobile communication system. The inventive transmission power control apparatus includes an fDT detection performed at the mobile unit 102 for detecting its own speed for adjusting transmission power and at the base station 101 for predicting transmission power of the mobile unit through the predictive approach. Referring to FIG. 10, a transmit power controller 190a at the mobile unit 102 modifies the transmit power controller 190 of FIG. 1 by adding a speed detector 192 for detecting its own motion speed and a step size (Δ) selector 116 for selecting an optimal step size based upon the detection of fDT. An adjuster 181b at the base station 101 modifies the adjuster 181 of FIG. 1 by adding a speed detector 182 for detecting the moving speed of the mobile unit 102 and a step size (Δ) selector 113. The speed detectors 182 and 192 perform the same function and include counters 112 and 115, and accumulators 111 and 114, respectively. The step size selector 113 and 116 also perform the same function.

In the transmit power controller 190a, the accumulator 114 stores a predetermined number of TPC bits received at the mobile unit 102 as a series and then the counter 115 counts the number of the serials and group-serials of the accumulated TPC bits. The counted results of the serials and group-serials are inputted to the step size selector 116, where a step size Δ is selected based upon both the counted results and the previous step size Δ selected by the selector 116. The amplifier 105 inputs a selected step size from the step size selector 116 and a TPC bit currently received at the mobile unit 102, multiplies them and outputs an amplified result to an integration circuit including an adder 106 and a delay circuit 107.

Similarly, in the adjuster 181b at the base station 101, a predetermined number of delayed TPC bits through the delay circuit 110 are stored in the accumulator 111. The counter 112 counts the number of the serials and group-serials. The counted results of the serials and group-serials are inputted to the step size selector 113, where a step size Δ is selected based upon both the counted results and the previous step size Δ selected by the selector 113. The amplifier 109 receives a selected step size Δ from the step size selector 113 and a 1T delayed TPC bit from the delay circuit 110 for multiplication and outputs an amplified result to the adder 108.

As the graph of transmission power control error characteristic of FIG. 32 illustrates, the transmission power control error characteristic is much improved with step size Δ=Δ1 dB when fDT≦0.01, and with step size Δ=Δ2 dB when fDT>0.01. Such a desirable condition can only be achieved by detecting the moving speed, fDT, of a mobile unit, and therefore the fDT detection of a mobile unit is proved to be essential for improving the power control error characteristic.

According to this embodiment, fDT is calculated through the statistical characteristic of TPC bits including the serials counting and group-serials counting of TPC bits. Here, fDT may be identified, for example, by comparing the frequencies of the serials and group-serials of TPC bits obtained through simulation or actual measurement and the frequencies of the serials and group-serials of TPC bits obtained through actual transmission by the predetermined number of TPC bits. Alternatively, the number, other than the frequency, of the serials and group-serials through simulation or actual measurement and through actual transmission may be compared to identify the fDT.

Figure 11:
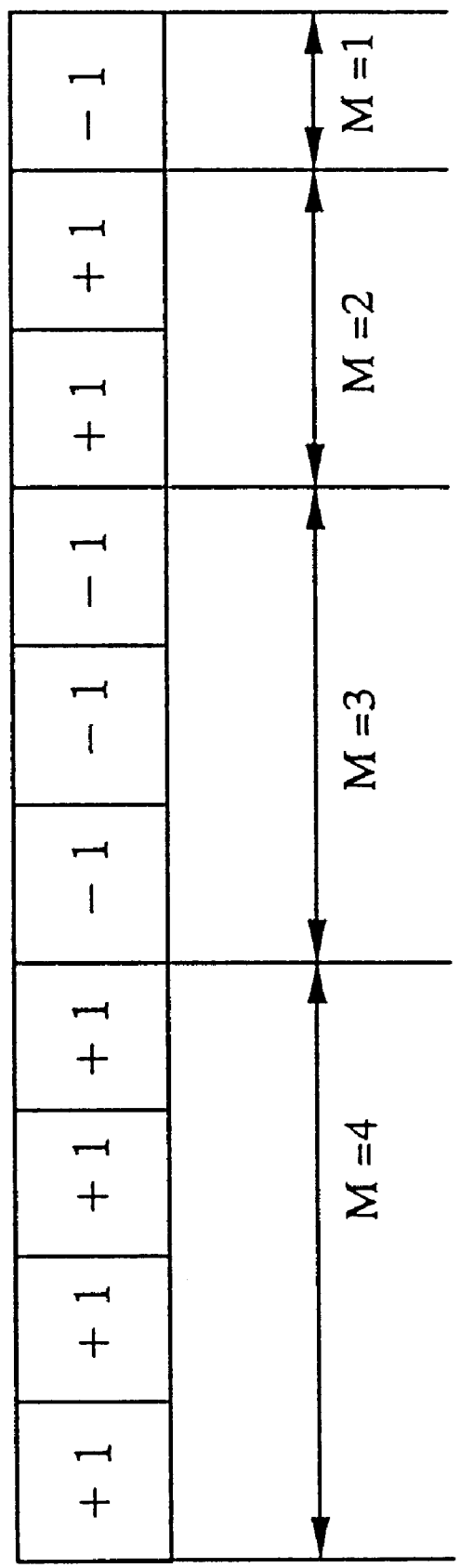
FIG. 11 illustrates serials counting with a TPC-bit sample according to the fourth embodiment.

FIG. 11 shows the serials counting according to this embodiment with a sample S of ten TPC bits (S=10) accumulated in series. In the sample, TPC bits are counted in four different types (M=1, M=2, M=3, and M=4). The serials counting counts the number of TPC bits of the same sign (±) in the sample of TPC bits. For example, a type of counting, M=4, designates four TPC bits of the same sign appearing in series in the sample. Another type of counting, M=1, designates a single TPC bit isolated from other TPC bits of the same sign in the sample. FIG. 12 shows a table illustrating the count and frequency of the serials of the TPC-bit sample of FIG. 11, wherein the frequency of the serials is calculated with the sample number (S=10) as the denominator for simplicity. For example, with M=1, the isolated TPC bit is counted once, 1, in the sample (S=10), and therefore, the frequency is calculated 1/10. With M=4, a group of four consecutive TPC bits appears once, 1, in the sample (S=10), which calculates the frequency 1/10.

Figure 13:
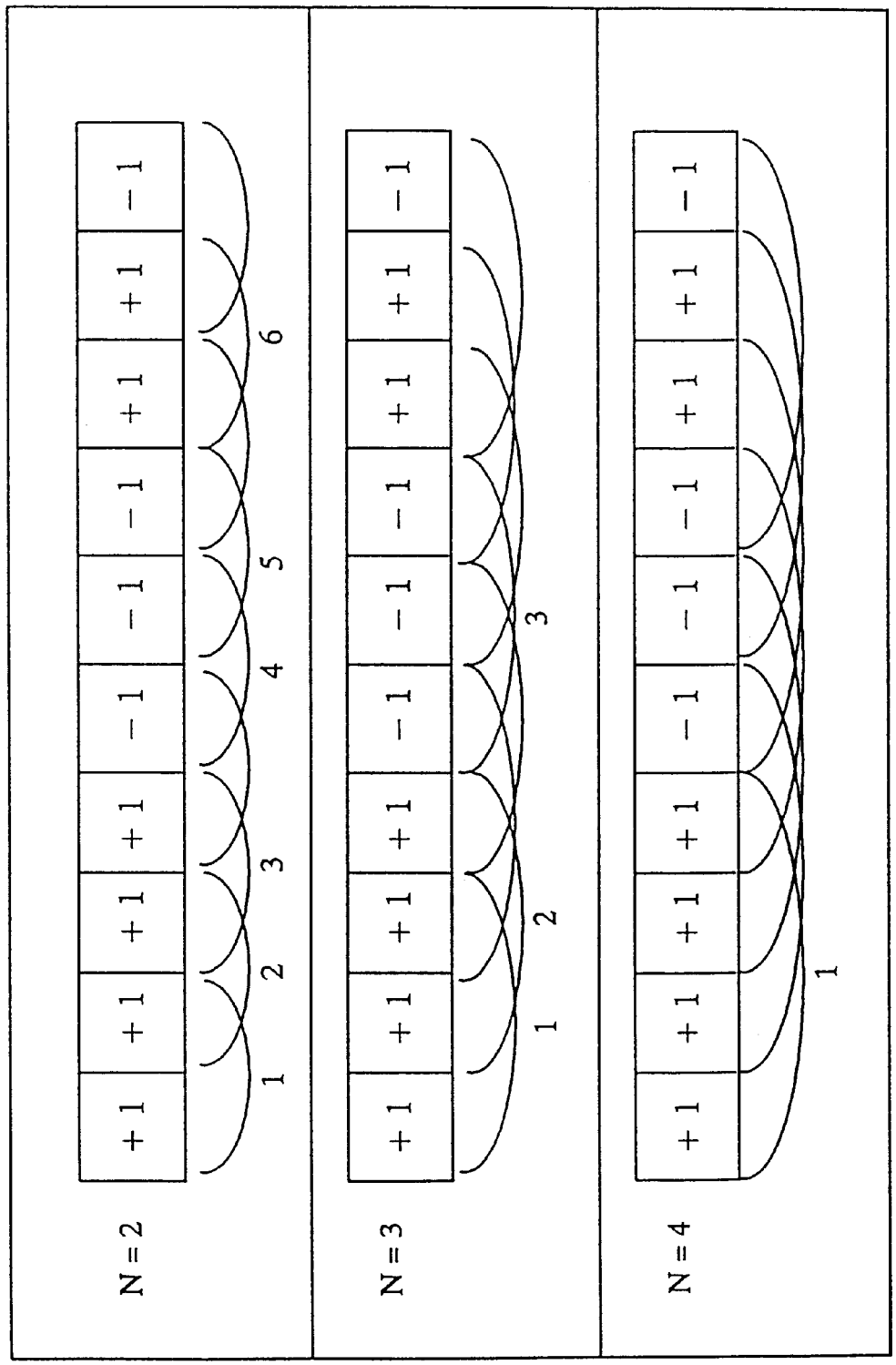
FIG. 13 shows three different types of group-series counting with TPC-bit samples according to the fourth embodiment.

FIG. 13 shows three types of the group-series counting according to this embodiment, each illustrating a sample of ten TPC bits (S=10) accumulated in series. A first counting type, N=2, designates a pair-serials counting, that is, the number of pairs of TPC bits of the same sign appearing in series is counted in the sample TPC bits. A second counting type, N=3, designates a triplet-serials counting, that is, the number of triplets of TPC bits of the same sign appearing in series is counted in the sample TPC bits. A third counting type, N=4, designates a quadruplet-serials counting, that is, the number of quadruplets of TPC bits of the same sign appearing in series is counted in the sample TPC bits. FIG. 14 illustrates the count and frequency of the group-serials of TPC bits of the three types of the group-serials counting of FIG. 13, wherein the frequency of the serials is calculated with the sample number (S=10) as the denominator for simplicity. For example, with N=2, six consecutive pairs of TPC bits of the same sign are counted in the sample (S=10), and therefore, the frequency 6/10 is calculated. With N=4, a quadruplet of TPC bits is counted, and therefore, the frequency 1/10 is calculated.

Figure 15:
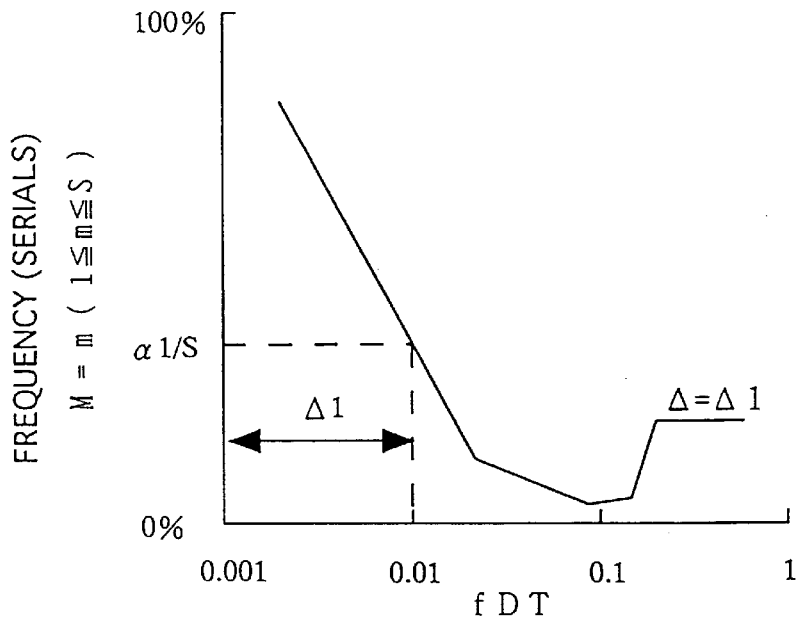
FIG. 15 shows a graph of frequency distribution of the TPC-bit serials illustrating the detection of Doppler frequency according to the fourth embodiment.
Figure 16:
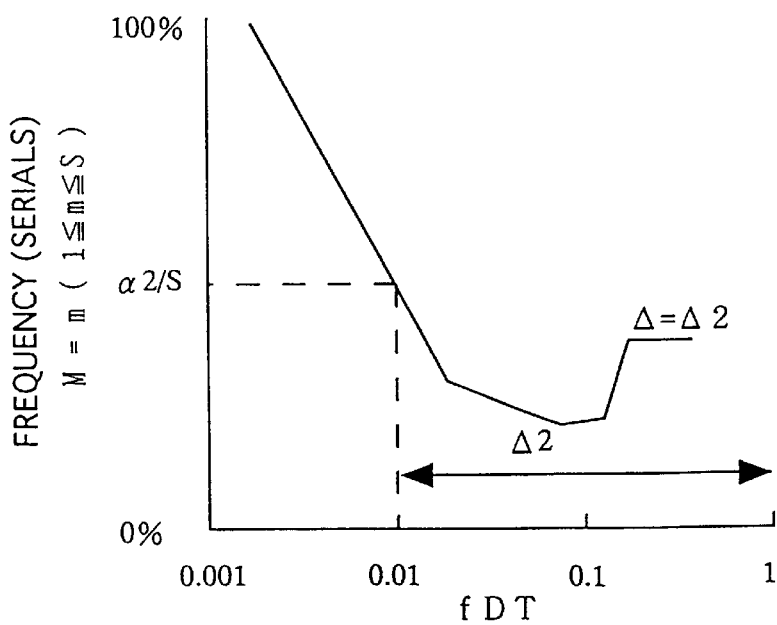
FIG. 16 shows a graph of frequency distribution of the TPC-bit serials illustrating the detection of Doppler frequency according to the fourth embodiment.

FIG. 15 shows a graph of frequency distribution of the serials based upon the TPC bits obtained previously through simulation or actual measurement when Δ=Δ1 dB and M=m(1≦m≦S). The graph is drawn with the frequency as the vertical scale and fDT as the horizontal scale. FIG. 16 shows a graph of frequency distribution of the serials based upon the TPC bits obtained previously through simulation or actual measurement when (Δ=Δ2 dB) when M=m(1≦m≦S) in the same graph as that of FIG. 15. The frequency of the serials of FIGS. 15 and 16 is calculated with the sample number S as the common denominator for simplicity. In the graphs, the frequency of the serials is especially significant when fDT=0.01: the frequency of the serials is α1/S with step size Δ=Δ1 dB, and α2/S with step size Δ=Δ2 dB. According to the frequency distribution of TPC bits obtained through simulation or actual measurement, with transmission power control based upon a step size Δ=Δ1 dB, the motion speed, fDT, of the mobile unit can be judged below 0.01 when the frequency of the serials is more than α1/S. This indicates that step size Δ=Δ1 dB should be used for controlling transmission power when the frequency of the serials is higher than α1/S. When the frequency of the serials is lower than α1/S in the midst of transmission power control using step size Δ=Δ1 dB, the moving speed, fDT, of a mobile unit can be judged above 0.01. In this case, the step size should be changed to step size Δ=Δ2 dB in accordance with an increase in motion speed of the mobile unit.

Figure 17:
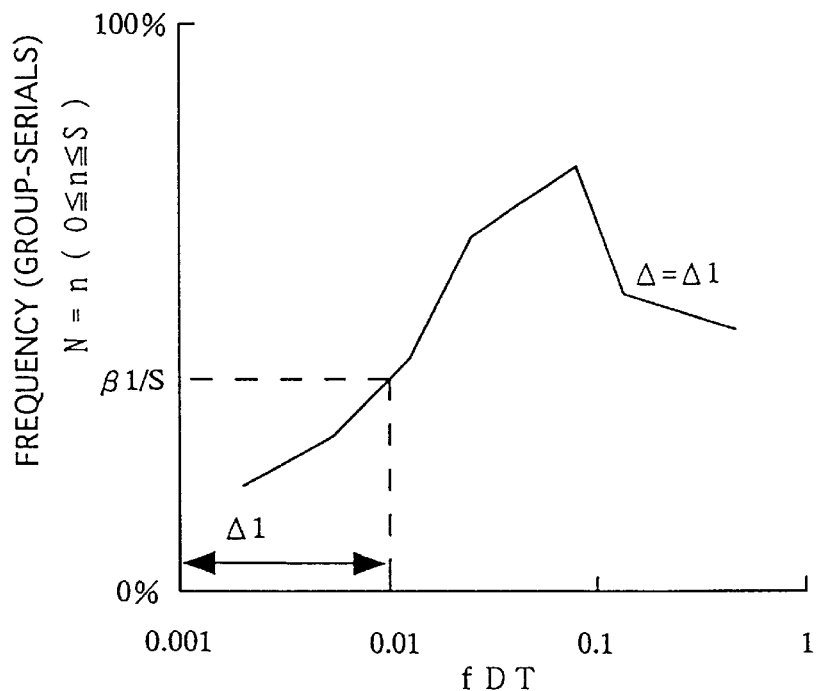
FIG. 17 shows a graph of frequency distribution of the TPC-bit group-serials illustrating the detection of Doppler frequency according to the fourth embodiment.
Figure 18:
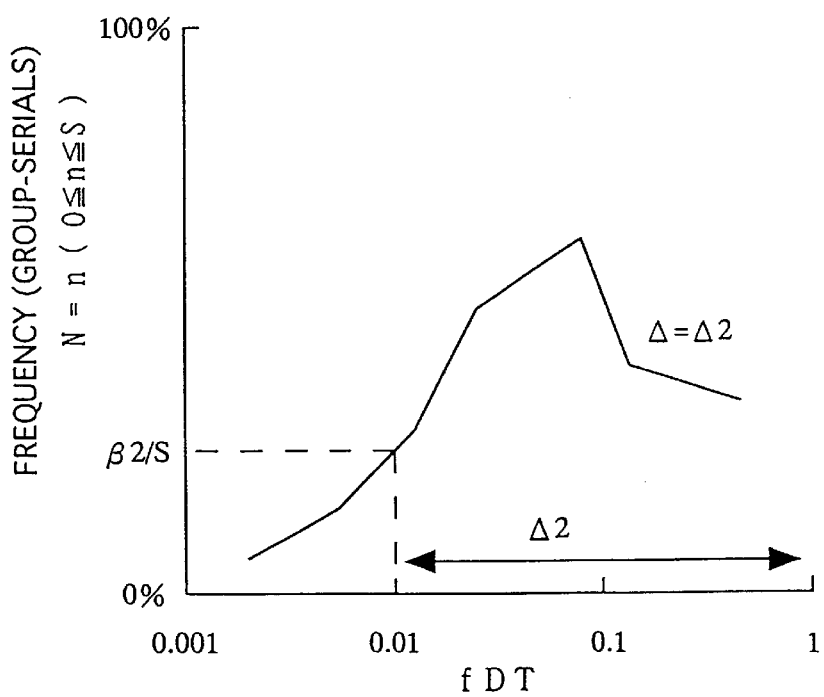
FIG. 18 shows a graph of frequency distribution of the TPC-bit group-serials illustrating the detection of Doppler frequency according to the fourth embodiment.

FIG. 17 shows a graph of frequency distribution of the group-serials based upon the TPC bits obtained previously through simulation or actual measurement when Δ=Δ1 dB and N=n(0≦n≦S). The graph is drawn with the frequency as the vertical scale and fDT as the horizontal scale. FIG. 18 shows a graph of frequency distribution of the group-serials based upon the TPC bits obtained previously through simulation or actual measurement when Δ=Δ2 dB and N=n (0≦n≦S) in the same graph as that of FIG. 17. FIGS. 17 and 18 indicate that the moving speed, fDT, of a mobile unit may be judged whether fDT is below or above 0.01 based upon the values β1/S and β/S of the frequency of the group-serials.

FIG. 19 shows a table illustrating switching guideline of step size between Δ=Δ1 dB and Δ=Δ2 dB with the switching index of the frequencies of the serials and group-serials when fDT=0.01 with reference to the frequency characteristics of the serials and group-serials illustrated in FIGS. 15 through 18. Switching convenience may be achieved through the implementation of the switching index especially when the serials and group-serials are both used, eliminating troublesome frequency switching practice.

With further reference to FIGS. 15 through 18, a step size may be switched based upon the count number of the serials and group-serials rather than the frequencies thereof. A count number-based switching is equivalent to one based upon the frequency, because the frequency is calculated based upon the count number divided by the sample number S as illustrated in the tables of FIGS. 12 and 14. The guideline may, therefore, be set based upon the count number of the serials and group-serials.

Figure 20:
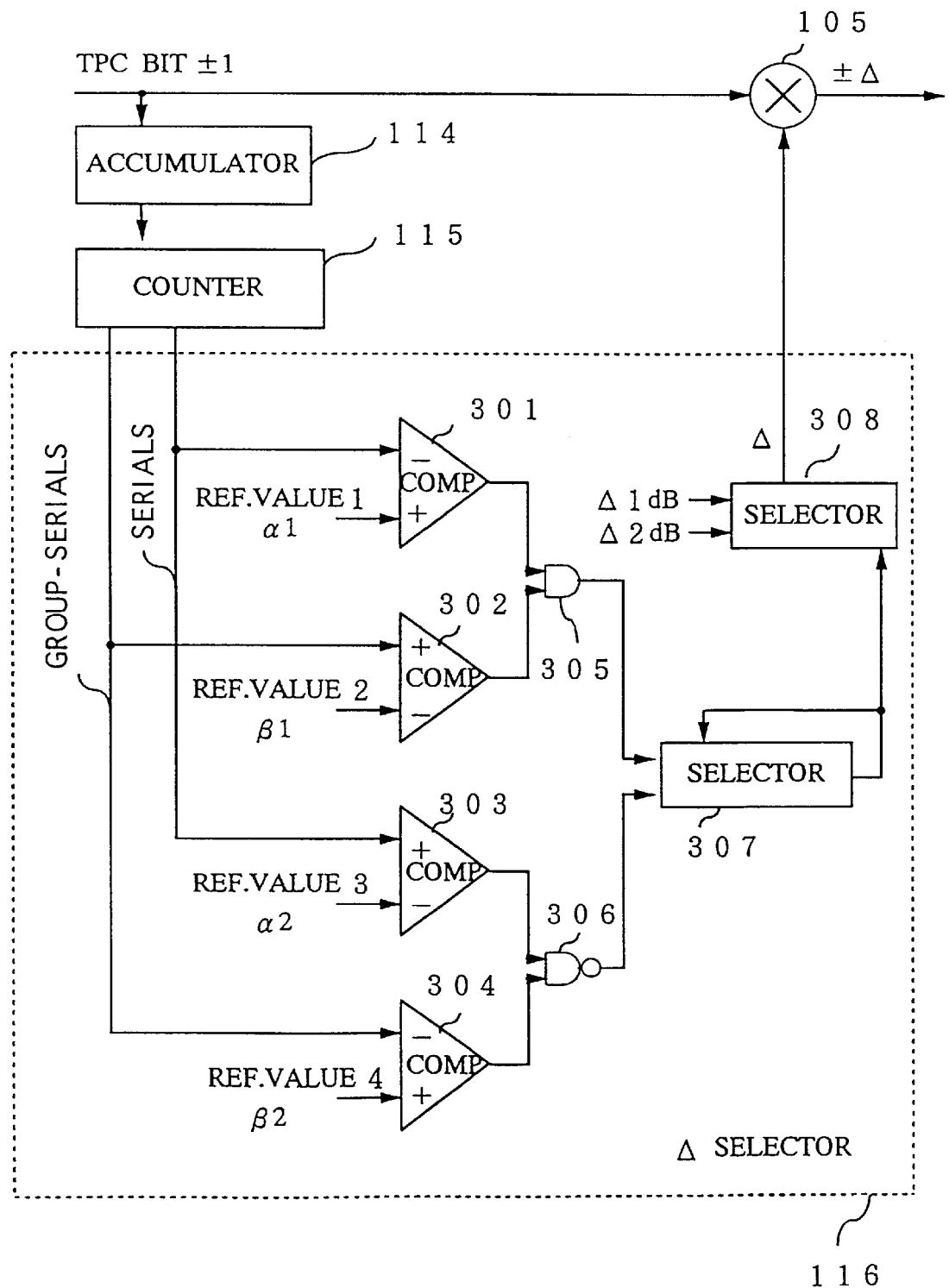
FIG. 20 shows a block diagram of the step size selector of FIG. 10 in detail.

FIG. 20 shows a block diagram of the step size selector 116 in the transmit power controller 190a of the mobile unit 102 of FIG. 10 in detail, illustrating a step size selection when using the count number of the serials and group-serials. The discussion also applies to the counterpart step size selector 113 at the base station 101.

Referring to FIG. 20, the step size selector 116 includes comparators 301, 302, 303, and 304, an AND gate 305, a NAND gate 306, and selectors 307 and 308. Here, it is assumed that the initial value of step size Δ is set to Δ1 dB, the selector 307 selects an AND gate output, and the selector 308 selects Δ1 dB.

With the serials, the number counted in the counter 115 is supplied to the comparators 301 and 303. The comparator 301 compares the count number with reference value 1 corresponding to α1. The comparator 301 outputs a value (+1) when the number is less than α1, and outputs a value (−1) when the number is α1 or more. The comparator 303 compares the count number with reference value 3 corresponding to α2. The comparator 303 outputs a value (+1) when the count number is α2 or more, and outputs a value (−1) when less than α2.

With the group-serials, the number counted in the counter 115 is supplied to the comparators 302 and 304. The comparator 302 compares the count number with reference value 2 corresponding to β1. The comparator 302 outputs a value (+1) when the count number is β1 or more, and outputs a value (−1) when less than β1. The comparator 304 compares the count number with reference value 4 corresponding to β2. The comparator 304 outputs a value (+1) when the count number is less than β2, and outputs a value (−1) when the number is β2 or more.

Compared results from the comparators 301 and 302 are ANDed and the AND gate 305 outputs a value (+1) only with values (+1) inputted from the both comparators, and otherwise outputting a value (−1). In other words, the AND gate 305 outputs a value (+1) when the count number of the serials is less than α1 together with the count number of the group-serials β1 or more. Compared results from the comparators 303 and 304 are NANDed and the NAND gate 306 outputs a value (−1) only with values (+1) outputted from the both comparators, and otherwise outputting a value (+1). In other words, the NAND gate outputs a value (−1) when the count number of the serials is α2 or more together with the count number of the group-serials less than β2. Outputs from the AND and NAND gates 305 and 306 are subject to selection at the selector 307, whose input initially is set to the AND gate output.

The selector 307 selects an AND gate output and correspondingly the selector 308 selects step size Δ=Δ1 dB, as long as the AND gate 305 outputs a value (−1) when the count number of the serials is less than α1 together with the count number of the group-serials β1 or more. When the AND gate outputs a value (+1), when the count number of the serials is less than α1 together with the count number of the group-serials is β1 or more, the selector 307 selects a NAND gate output. The selector 308, correspondingly, selects step size Δ=Δ2 dB. Once the selector 307 has switched to output a NAND gate output, the selector 307 selects a NAND gate output and correspondingly the selector 308 selects step size Δ=Δ2 dB as long as the NAND gate 306 outputs a value (+1) when the count number of the serials is α2 or more, together with the count number of the group-serials less than β2. When the NAND gate 306 outputs a value (−1) with the count number of the serials a or more together with the count number of the group-serials less than β2, the selector 307 selects an AND gate output. The selector 308, correspondingly, selects step size Δ=Δ1 dB.

Consequently, the step size selector 116 produces advantageous and effective results: fDT detection is facilitated through the statistical characteristic of TPC bits; the precision of measurement is much improved through the statistical approach based upon the serials and group-serials; step size switching operations are facilitated through the AND selection between the serials and group-serials eliminating troublesome frequent switching practices.

Figure 21:
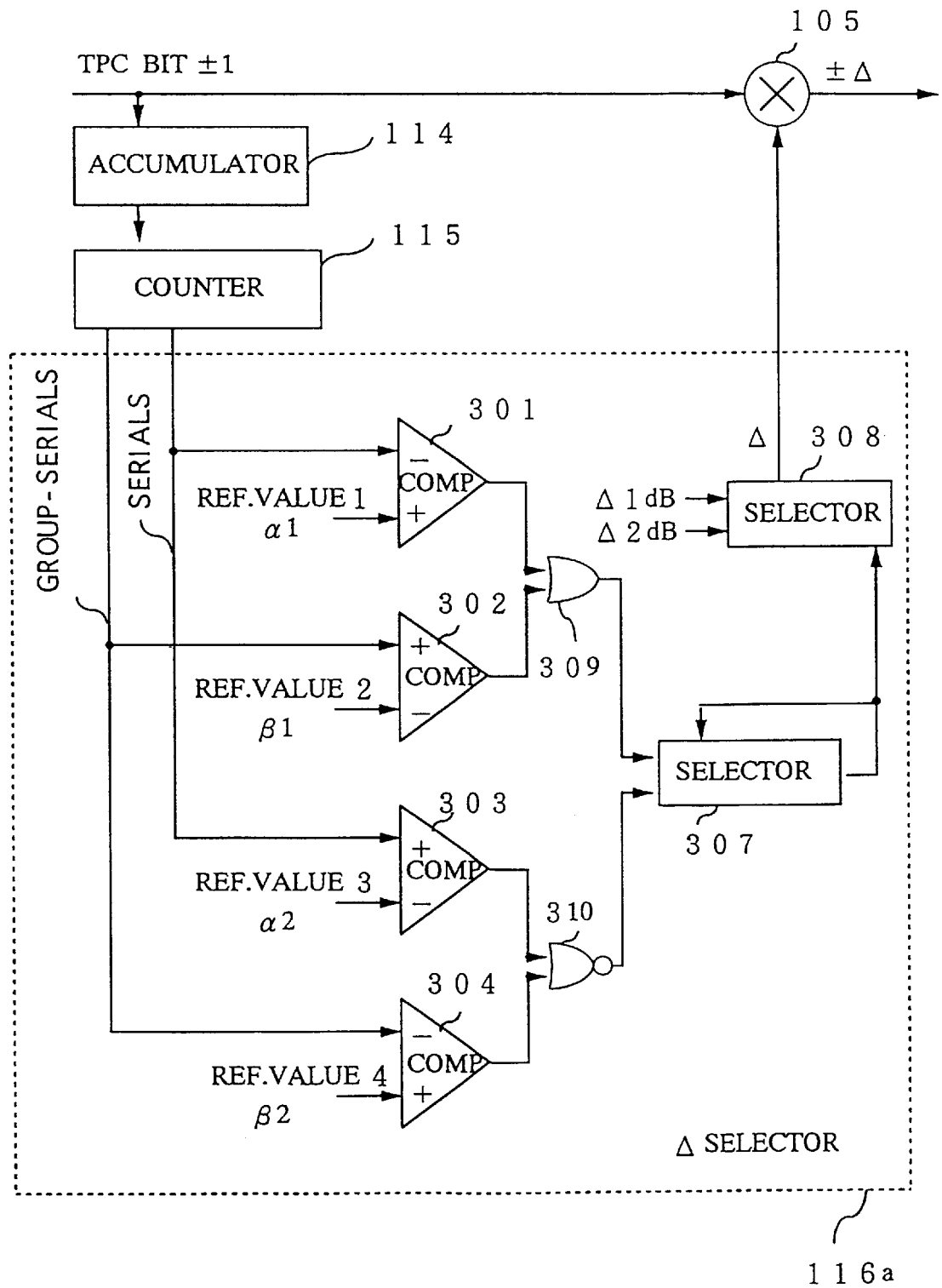
FIGS. 21 shows an alternative step size selector.
Figure 22:
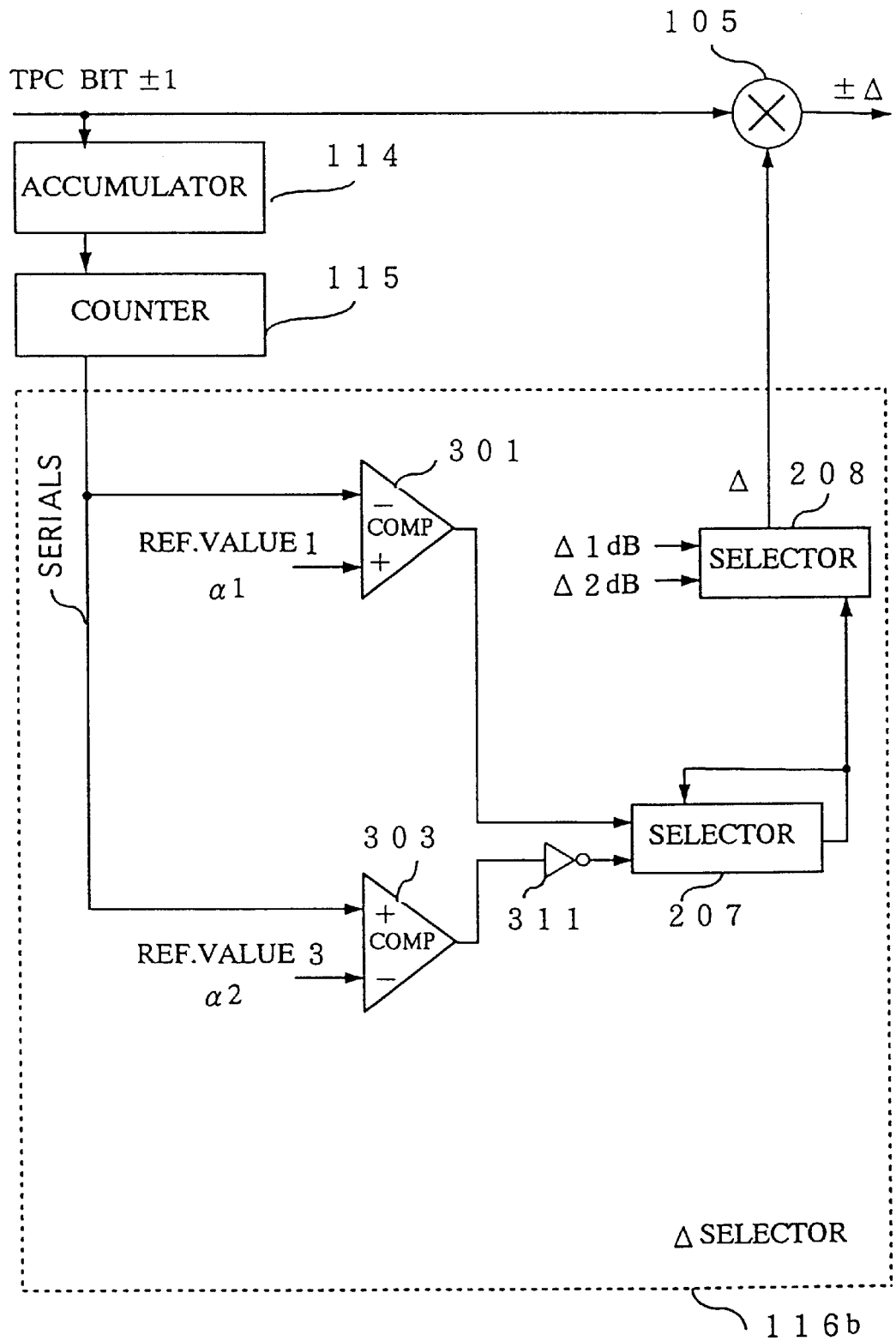
FIGS. 22 shows another alternative step size selector.
Figure 23:
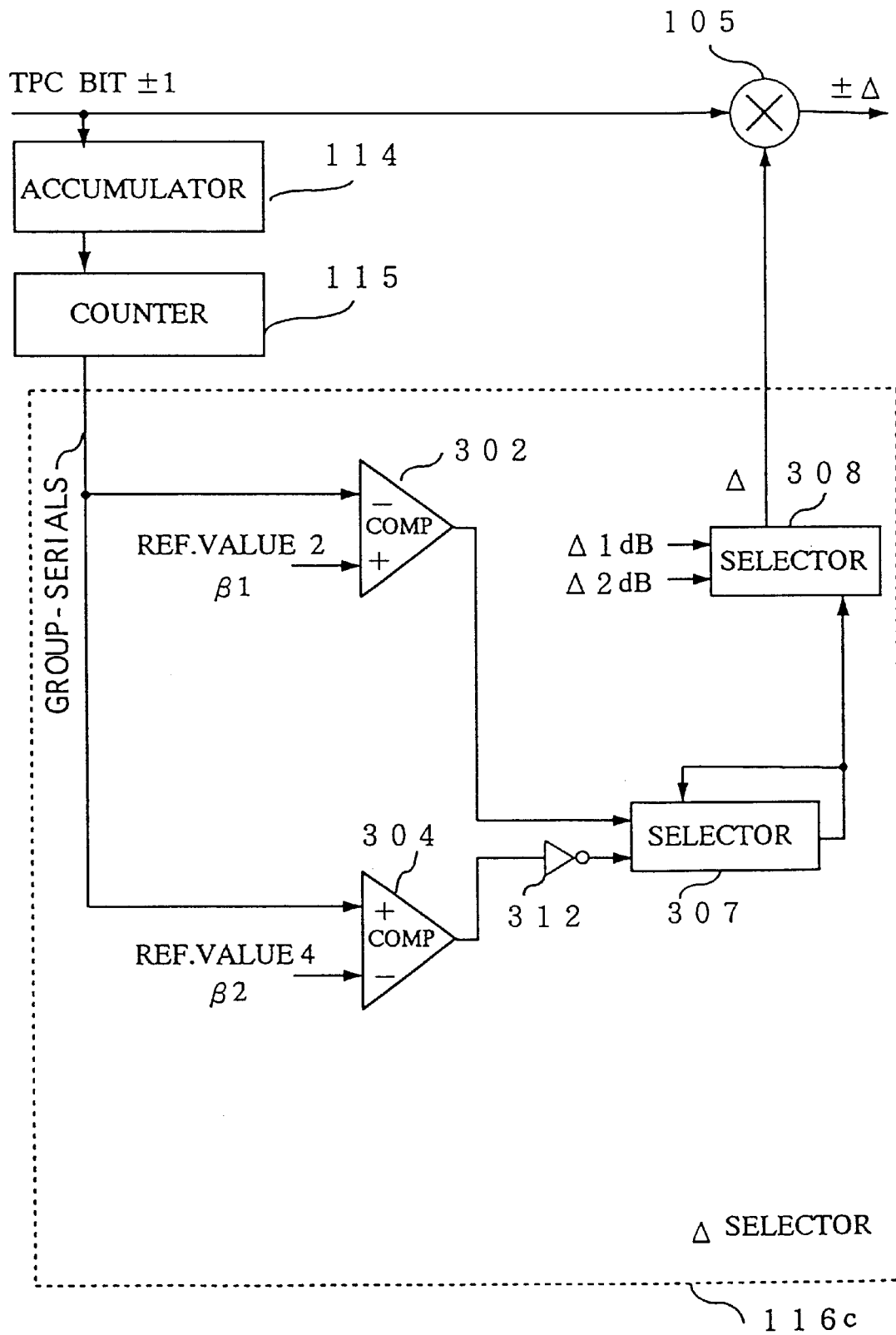
FIGS. 23 shows a still another alternative step size selector.

FIGS. 21 through 23 show alternatives of the step size selector 116 of FIG. 20. A step size selector 116a of FIG. 21 replaces an OR gate 309 and a NOR gate 310 for the AND gate 305 and the NAND gate 306 of FIG. 20, respectively. A step size selector 116b of FIG. 22 selects a step size based only upon the serials whereas a step size selector 116c of FIG. 23 based only upon the group-serials. The selectors 116b and 116c employed NOT gates 311 and 312, respectively, in the figures for the sake of convenience. Those NOT gates are not necessarily required, and a comparator output may be inputted directly to the selector.

With further reference to the step size selector 116 of FIG. 20 and the alternatives of this embodiment, the count number of the serials, the count number of the group-serials, and reference values 1 through 4 ($\alpha 1$, $\beta 1$, $\alpha 2$, $\beta 2$) may be replaced by those divided by the sample number S, i.e., the frequency of the serials, the frequency of the group-serials, and reference values 5 through 8 ($\alpha 1/S$, $\beta 1/S$, $\alpha 2/S$, $\beta 2/S$).

Figure 24:
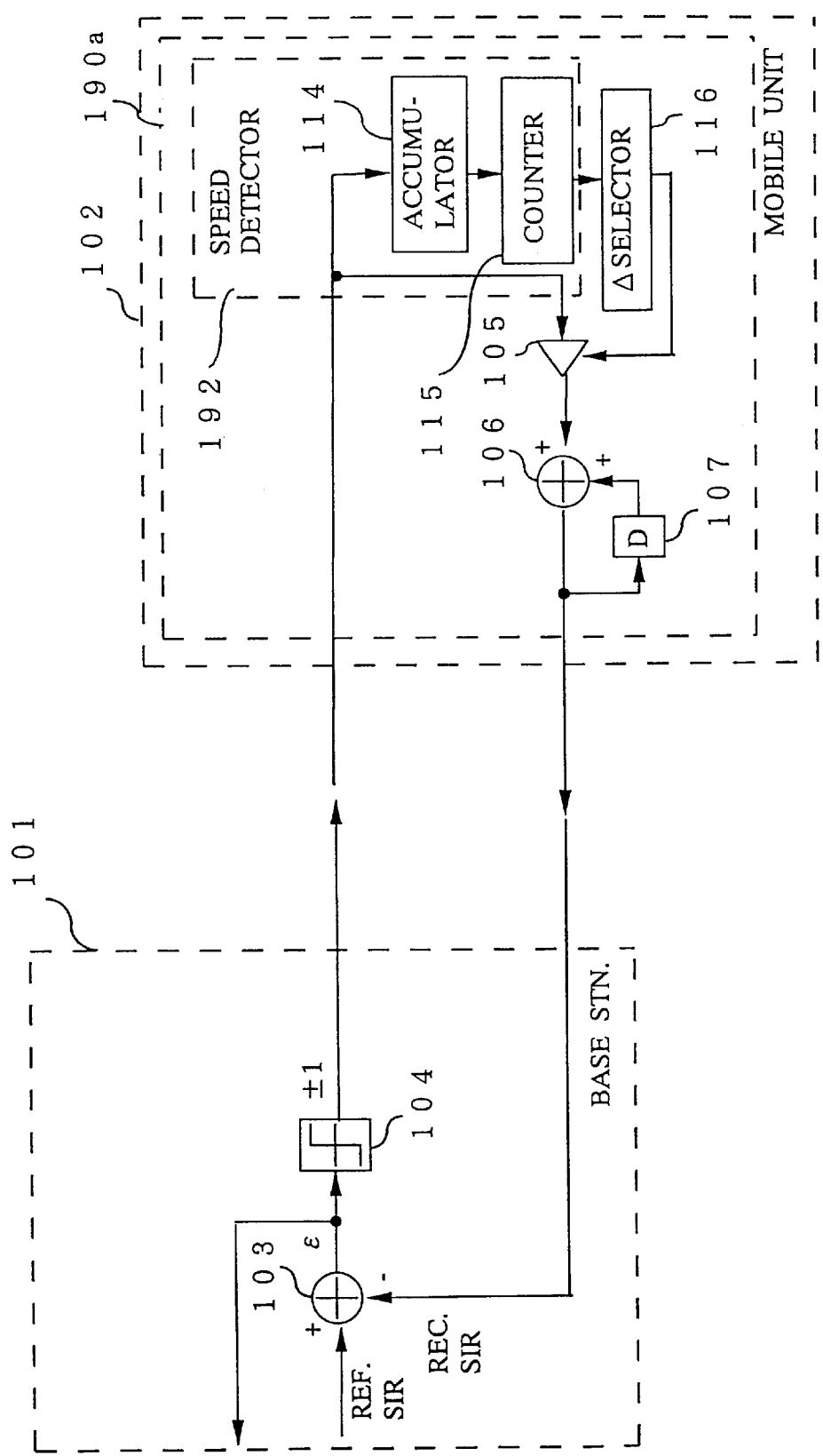
FIG. 24 shows a block diagram of an alternative transmission power control apparatus.
Figure 29:
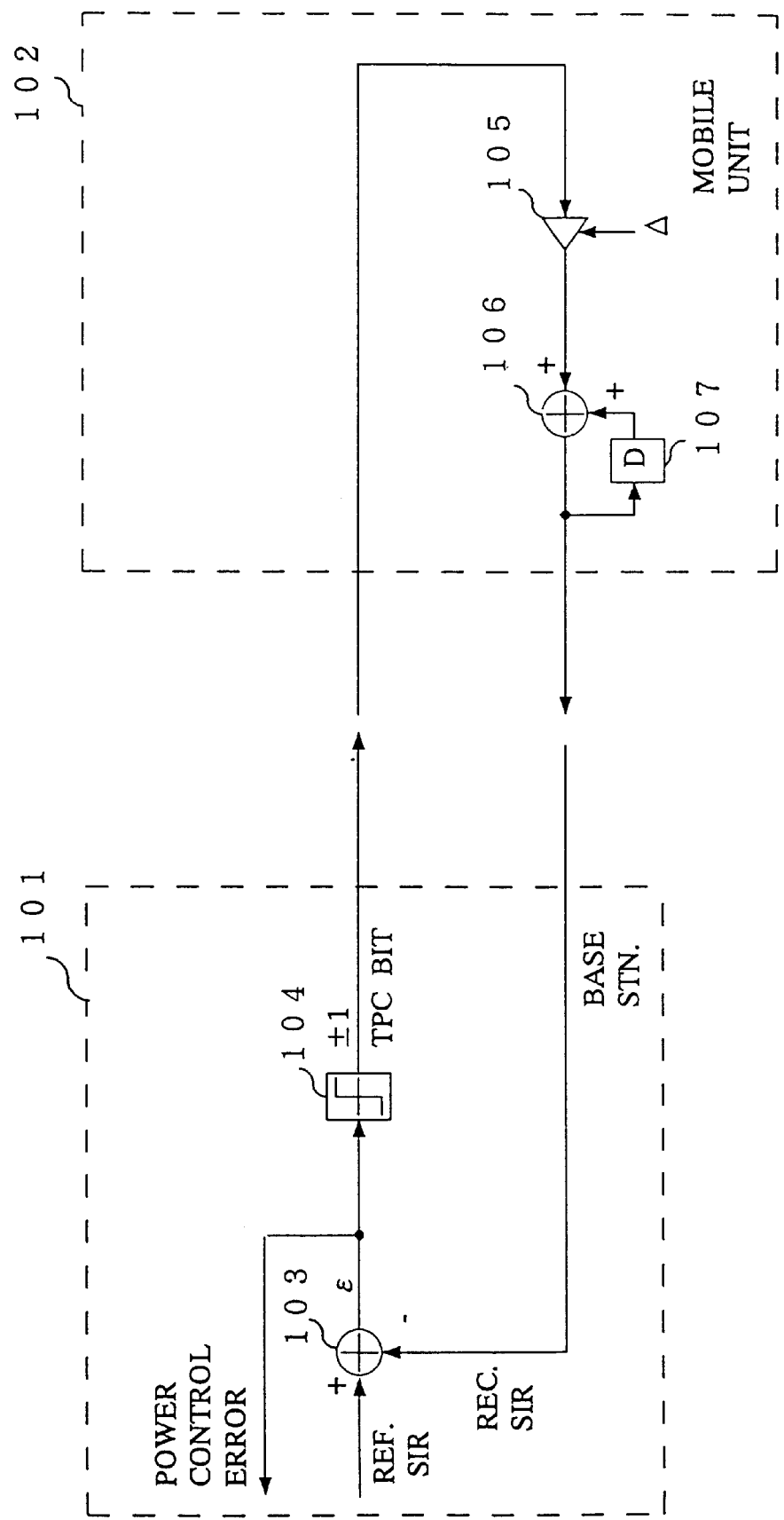
FIG. 29 shows a block diagram of a related transmission power control apparatus.
Figure 30:
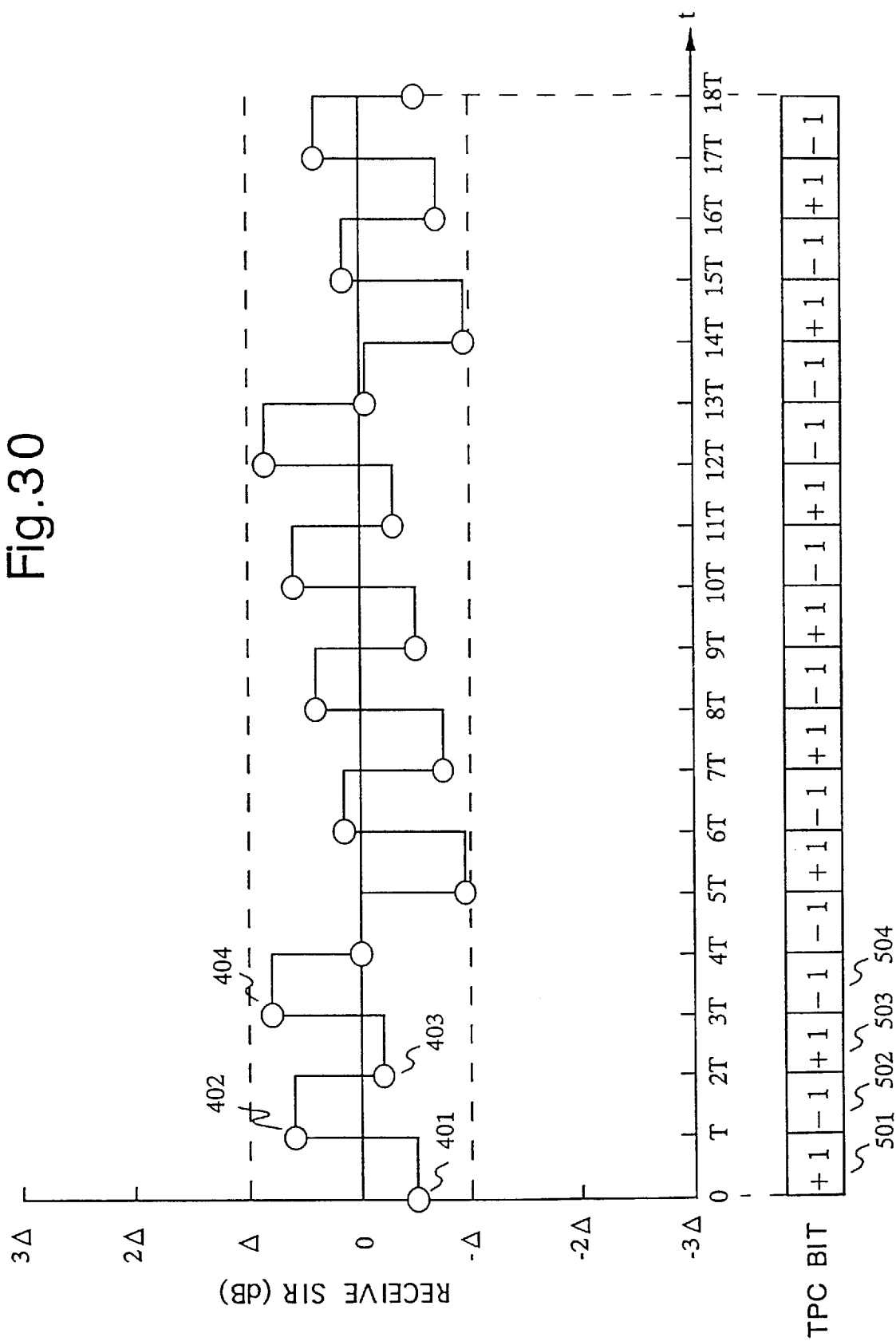
FIG. 30 shows a graph of a desirable power variation characteristic of transmission power received at a base station with no power control delay.
Figure 31:
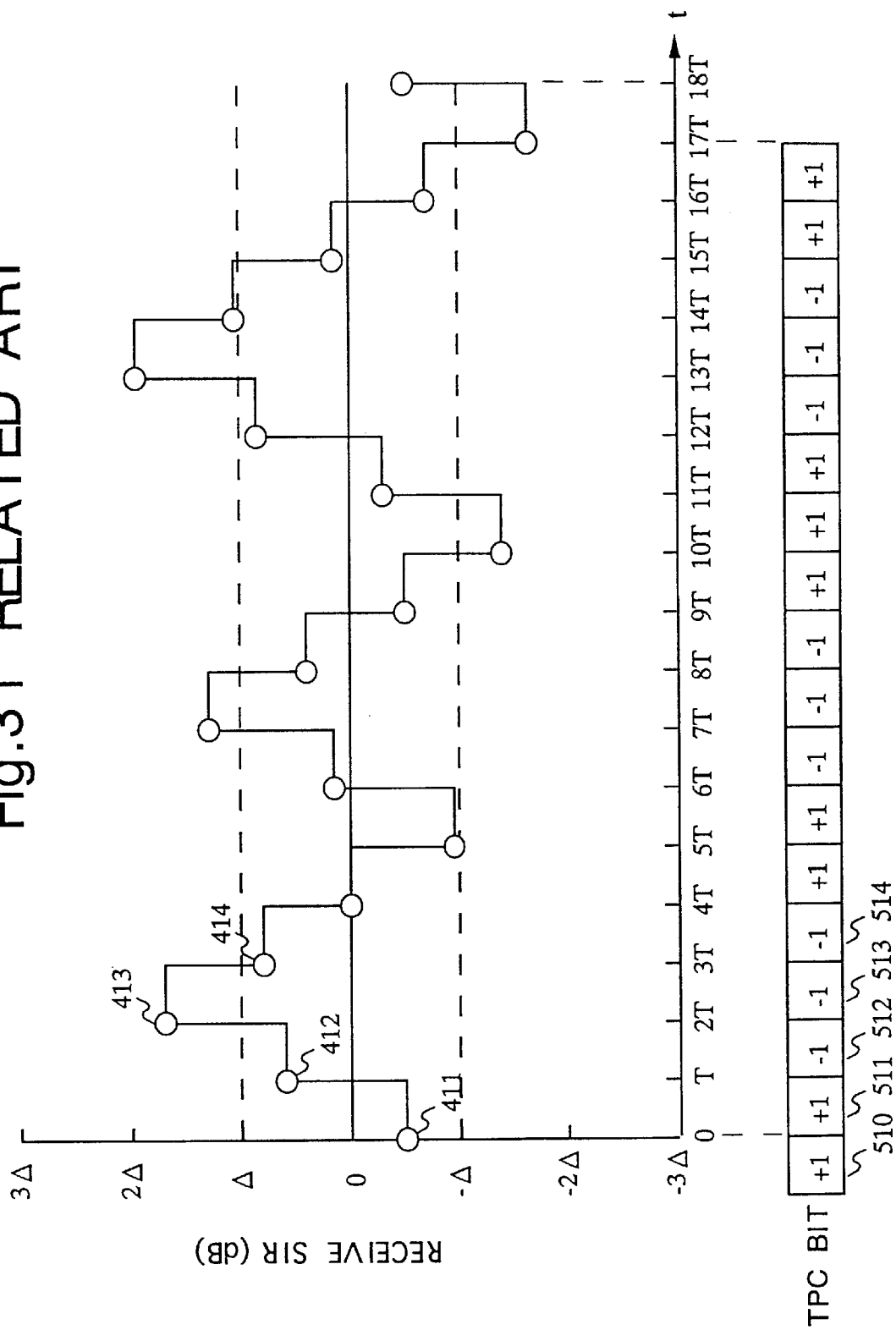
FIG. 31 shows a graph of a power variation characteristic of transmission power received at the base station with a power control delay of 1T according to the transmission power control apparatus of FIG. 29.

FIG. 24 shows a block diagram of an alternative transmission power control apparatus of this embodiment. The alternative adds the inventive speed detector 192 and the step size selector 116 in the transmit power controller 190a of this embodiment to the prior art transmit power controller of FIG. 29. According to this alternative, an optimal step size is selected only through the detection of the motion speed, fDT, of the mobile unit involving no adjustment of transmission power control command in compliance with the power control delay elaborated in the first embodiment. Thus, the power control error may be reduced by the optimal step size selection through the detection of the motion speed, fDT, of a mobile unit based upon the statistical characteristics of a TPC bit.

Characteristic features of this embodiment for improving power control performance of transmission power are summarized as follows. A first inventive feature is that an optimal step size is selected and switched between a first step size $\Delta 1$ and a second step size $\Delta 2$ in order to reduce the power control error of Receive SIR subtracted from Reference SIR. A second inventive feature is that the step size is switched based upon a detected motion speed of a mobile unit: the first step size $\Delta 1$ is selected with the motion speed relatively slow, and the second step size $\Delta 2$, which is greater than the first step size, is selected with the motion speed relatively fast. The third inventive feature is the motion speed of a mobile unit may be detected through comparison of the counted number of the serials of TPC bits accumulated in a predetermined period of time with reference values. Alternatively, the motion speed of a mobile unit may be detected through comparison of the counted number of the group-serials of TPC bits accumulated in a predetermined period of time with reference values. The fourth inventive feature is the step size selector switches the first step size based power control to the second step size based power control when the number of the TPC-bit serials counts below the first reference value, and switches the second step size based power control to the first step size based power control when the number is the same as the third reference value or more. The step size selector switches the first step size based power control to the second step size based power control when the number of the TPC-bit group-serials counts the same as the second reference value or more, and switches the second step size based power control to the first step size based power control when the number of the TPC-bit group-serials counts less than the fourth reference value. The step size selector switches the first step size based power control to the second step size based power control when the number of the TPC-bit serials counts less than the first reference value together with the number of the TPC-bit group-serials counts same as the third reference value or more. The step size selector switches the second step size based power control to the first step size based power control when the number of the TPC-bit serials counts the same as the second reference value or more together with the number of the TPC-bit group-serials counts less than the fourth reference value.

Embodiment 5.

System interference due to sudden and sharp movements of channel power is another problem in transmission power control. A fifth embodiment of the present invention introduces the detection of such a sudden and sharp movement of channel power, designated by the broken line 601 of transmission power, in FIG. 26, based upon TPC bits in a predetermined pattern. When the predetermined TPC-bit pattern is detected, the transmission power of the mobile unit concerned is controlled to be leveled off. Through the detection of sudden and sharp movements in channel power, power control performance should be much improved even in the areas detecting higher fDT and then interference to other system users will also be desirably reduced, which will increase system user capacity.

Figure 25:
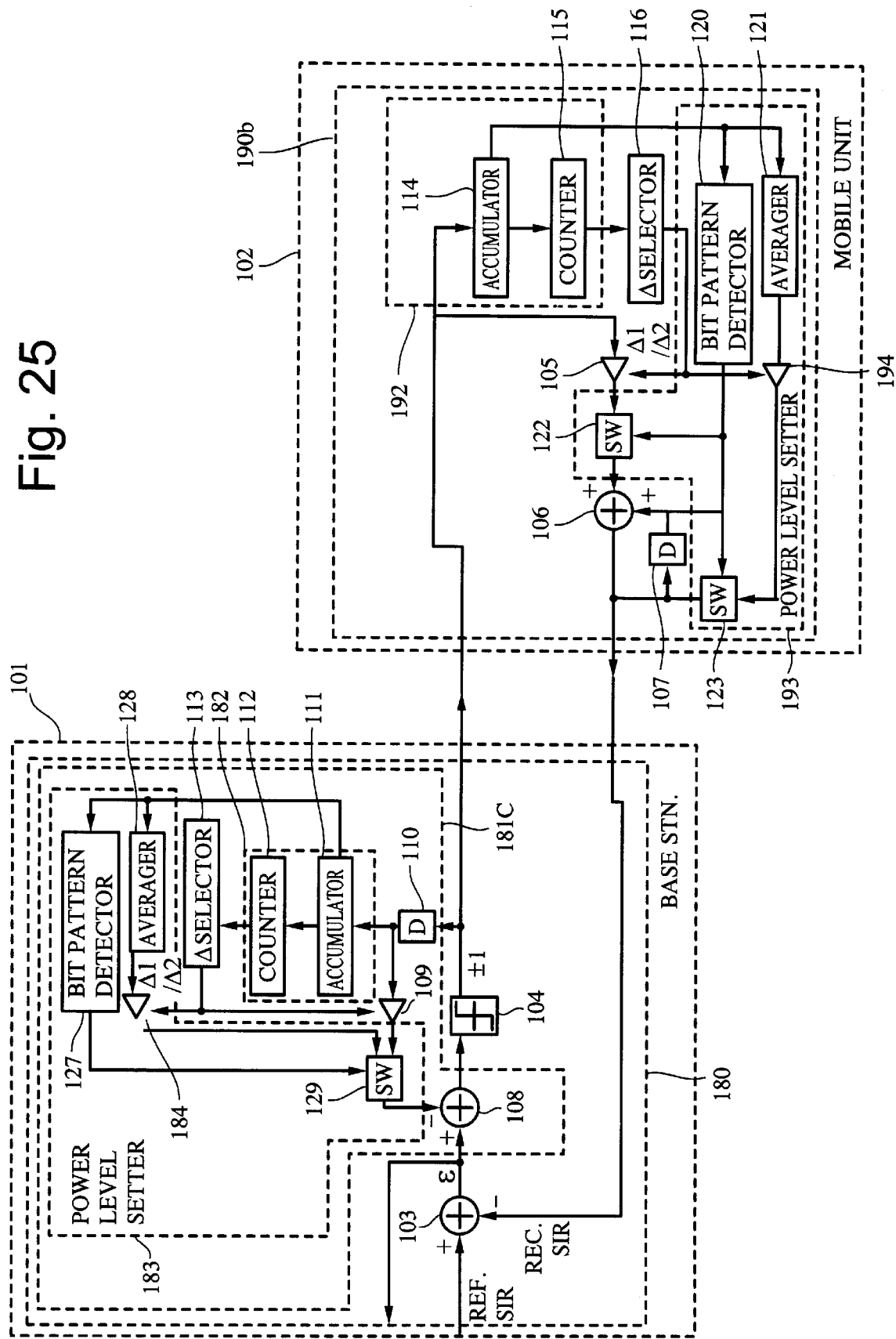
FIG. 25 shows a block diagram of a transmission power control apparatus according to a fifth embodiment of the present invention.

FIG. 25 shows a block diagram of a transmission power control apparatus according to this embodiment including power level setters 183 and 193 equipped in a command generator 180d at the base station 101 and in a transmit power controller 190b at the mobile unit 102, respectively, added to the transmission power control apparatus of FIG. 10.

Referring to FIG. 25, the power level setter 193 including a bit pattern detector 120, an averager 121, a switch circuit including switches 122 and 123, and an amplifier 194, resets transmission power to the mean value of transmission power previously transmitted from the mobile unit 102. The bit pattern detector 120 detects a predetermined pattern of TPC bits appearing in a series of accumulated TPC bits. The averager 121 calculates the mean value of a number of previously generated TPC bits (for example, one hundred) in series. The amplifier 194 multiplies the mean value outputted from the averager 121 by a step size. A series of TPC bits received at the mobile unit 102 and accumulated in the accumulator 114 are inputted to the bit pattern detector 120 for detecting the predetermined TPC-bit pattern and to the averager 121 in the power level setter 193. The bit pattern detector 120 outputs a value (+1) when detecting the predetermined TPC-bit pattern like (+1, +1, +1, +1, +1, +1, +1, +1, +1, −1 in series), and otherwise outputs a value (−1). With a value (−1) outputted from the bit pattern detector 120 indicating no detection of the pattern, the switch 122 is set to ON and the switch 123 is set to OFF, which brings the function of the transmit power controller 190b of FIG. 25 equal to that of the transmit power controller 190a of FIG. 10 performing the same operation elaborated in the fourth embodiment. With a value (+1) outputted from the bit pattern detector 120 indicating the detection of the pattern, the switch 122 is set to OFF and the switch 123 is set to ON. With the switch 122 OFF, the adder 106 having one side blocked by the switch and integration is reset only with an input from the delay circuit 107, and then a multiplied result outputted from the amplifier 194 is outputted from the mobile unit 102 as the transmission power.

At the base station 101, the power level setter 183 with a function similar to that of the power level setter 193 of the mobile unit 102 includes a bit pattern detector 127 for detecting the predetermined TPC-bit pattern, an averager 128 for averaging TPC bits in the predetermined pattern, an amplifier 184 for multiplying an output from the averaged 128 by a step size, and a switch 129 for selecting an output from the amplifier 184 with the predetermined pattern detected, and selecting an output from the amplifier 109 with no pattern detected.

Figure 26:
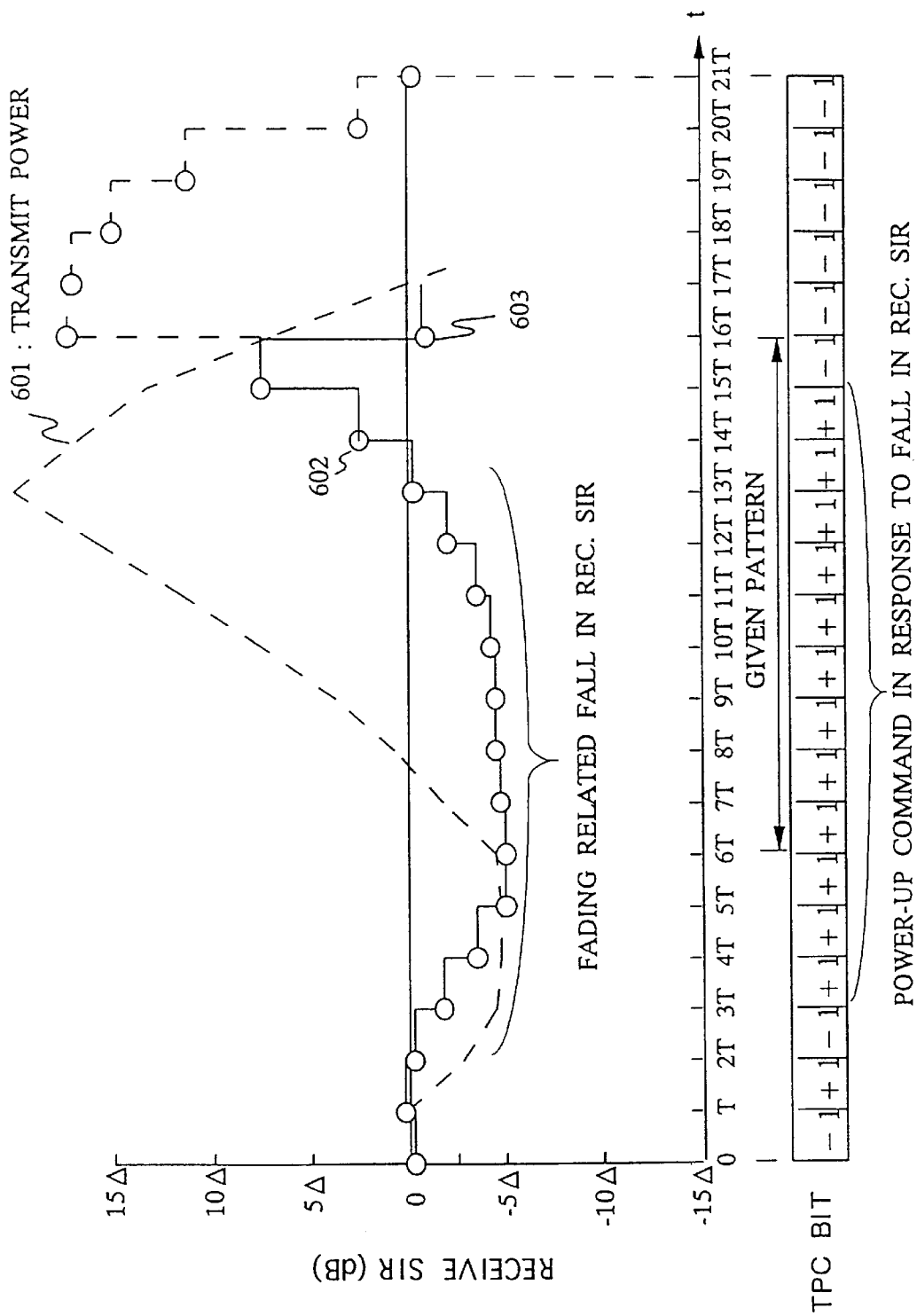
FIG. 26 shows a graph of a transmission power variation characteristic illustrating a power control operation according to the fifth embodiment.

FIG. 26 shows a graph of a transmission power variation characteristic according to this embodiment. Referring to FIG. 26, a mean value 603 is a multiplied result of the mean value of previously generated TPC bits by a step size. The value of transmission power is reset to the mean value 603 when the predetermined TPC-bit pattern is detected. In a preferred embodiment one should choose a bit pattern with n number of consecutive values of the same sign (+1), for example, followed by a value of different sign (−1) for the predetermined TPC-bit pattern. The mean value 603 may be calculated out of a consecutive hundred TPC bits previously generated. As FIG. 26 illustrates, the reset to the mean value 603 greatly reduces the conventional problem of system interference.

Figure 27:
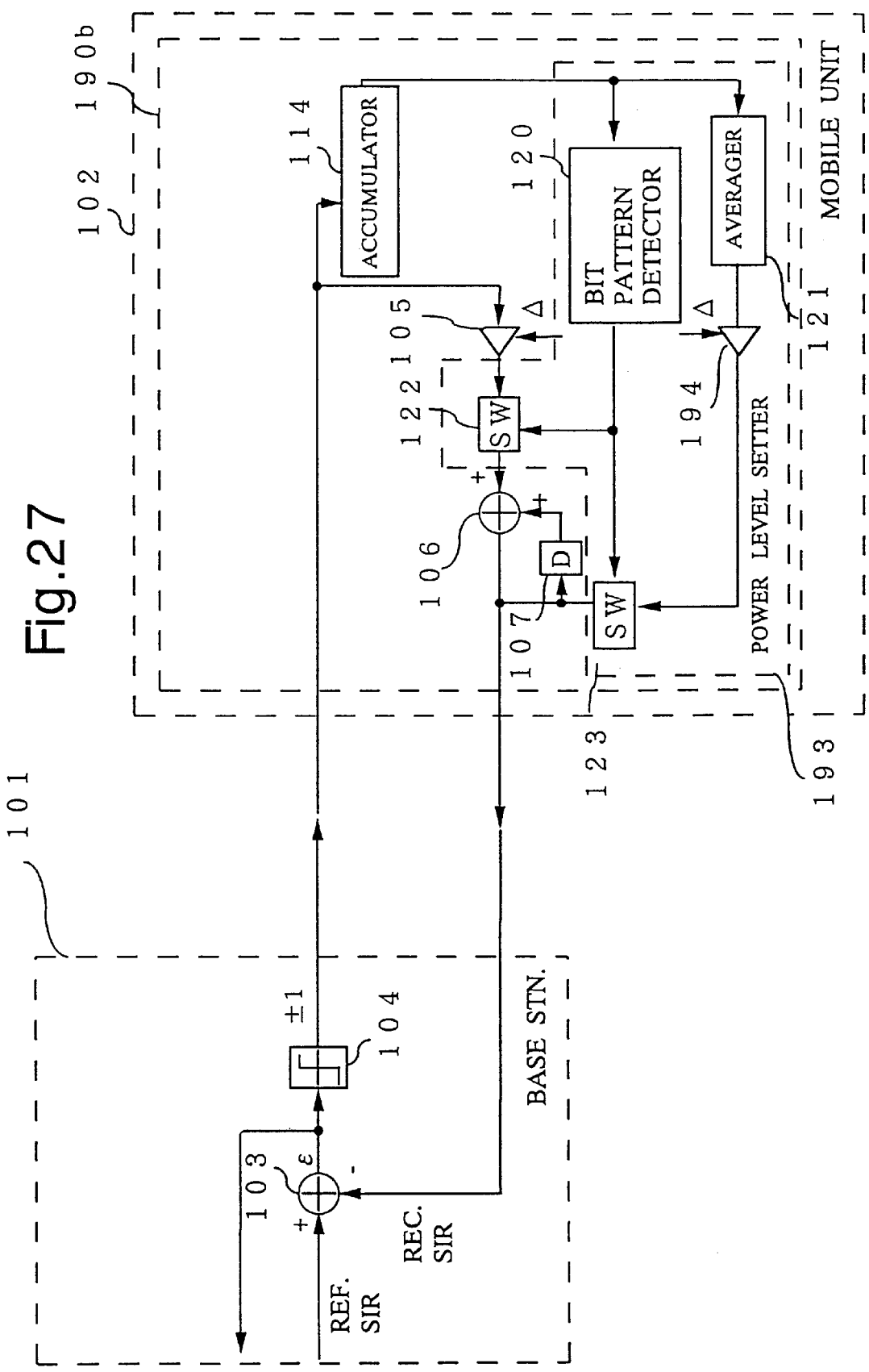
FIG. 27 shows a block diagram of an alternative transmission power control apparatus according to the fifth embodiment.

FIG. 27 shows a block diagram of an alternative transmission power control apparatus according to this embodiment. The alternative adds the inventive characteristic of the power level setter 193 and the accumulator 114 of this embodiment to the transmission power control apparatus of FIG. 29. With this alternative, system interference due to a sudden and sharp change in channel power should be much reduced.

Figure 28:
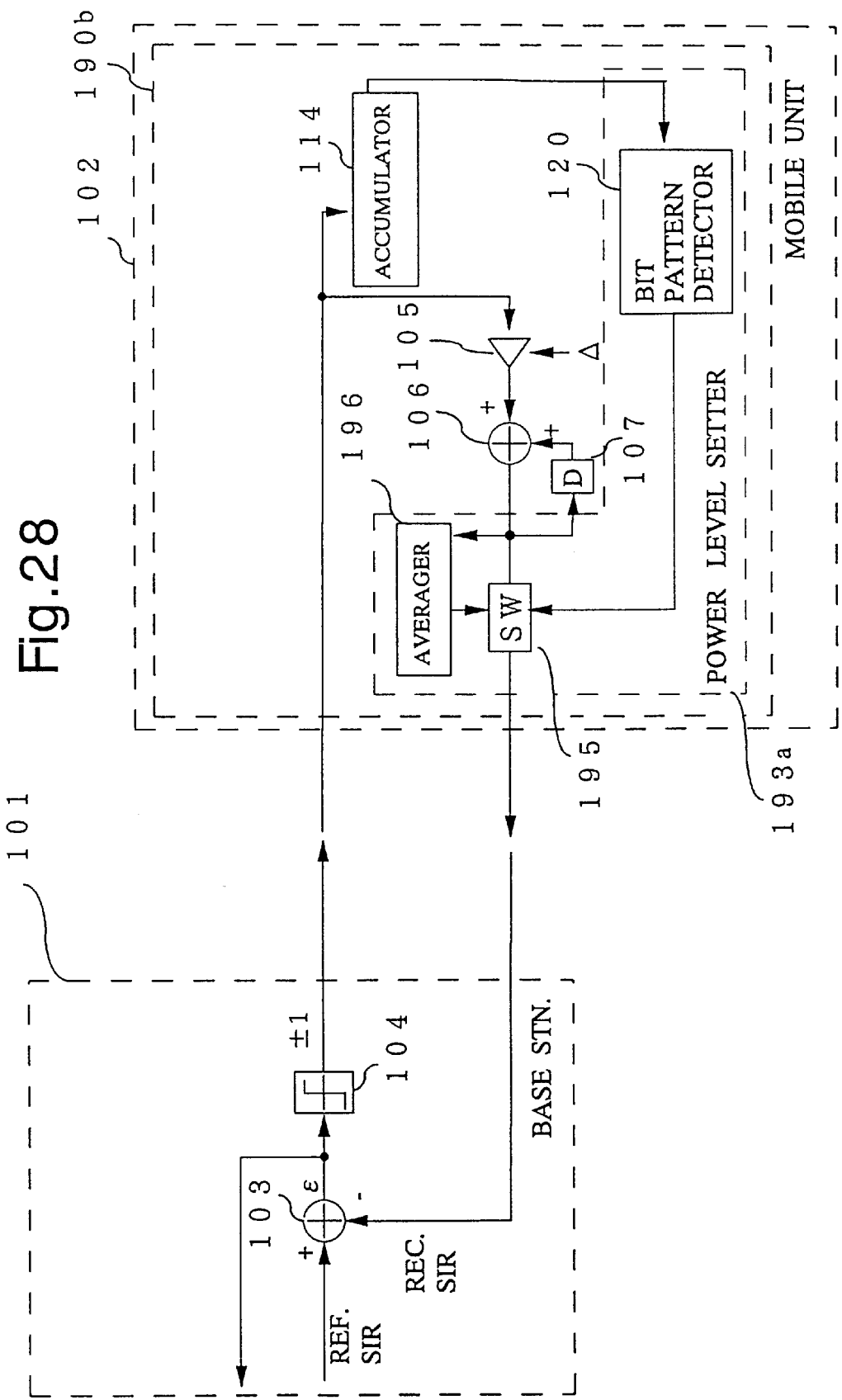
FIG. 28 shows a block diagram of another alternative transmission power control apparatus according to the fifth embodiment.

FIG. 28 shows a block diagram of another alternative transmission power control apparatus according to this embodiment. This alternative replaces the power level setter 193 of FIG. 27 with a power level setter 193a, whose power level is reset to the mean value of transmission power previously outputted from a transmit power controller 190b, and not to the mean value of TPC bits in the other alternatives of this embodiment.

The power level setter 193a includes an averager 196 for calculating the mean value of transmission power previously transmitted from the transmit power controller 190d and a switch 195 for selecting the mean value outputted from the averager 196 as transmission power when the bit pattern detector 120 detects the predetermined pattern of TPC bits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power control apparatus, controlling transmission power of a mobile unit communicating with a base station, comprising:

a command generator for generating a transmission power control command based upon the transmission power received from the mobile unit and transmitting the transmission power control command to the mobile unit, the transmission power control command controlling the transmission power; and a transmit power controller for receiving the transmission power control command and controlling the transmission power based upon a received transmission power control command;

wherein said command generator generates the transmission power control command based upon the transmission power received and the transmission power control command generated and transmitted to the mobile unit, wherein said command generator includes an adjuster for adjusting the transmission power control command based upon the received transmission power and the transmission power control command, said adjuster adjusting the transmission power control command during a power control delay resulting from transmission of the transmission power control command from the base station to the mobile unit and transmission of a controlled transmission power from the mobile unit back to the base station, wherein said adjuster includes a delay circuit for holding the transmission power, control command during the power control delay and then outputting a delayed transmission power control command, an amplifier for inputting the delayed transmission power control command, predicting an additional amount of power, equivalent to the transmission power to be controlled based upon the transmission power control command at the mobile unit, and outputting a predicted additional amount of power, and an adder for adding the predicted additional amount of power to the power control error.

2. The power control apparatus of claim 1, wherein said command generator generates a predetermined reference power, wherein said command generator includes, an adder for calculating a difference between the received transmission power and the predetermined reference power and outputting the difference as a power control error, and a judger for generating the transmission power control command by judging required power level of the received transmission power based upon the power control error; and wherein said adjuster inputs the transmission power control command and adjusts the power control error.

3. The power control apparatus of claim 1, wherein said command generator generates a predetermined reference power, wherein said command generator includes, an adder for calculating a difference between the received transmission power and the predetermined reference power and outputting the difference as a power control error, and a controller for receiving the power control error and outputting the transmission power control command based upon the power control error.

4. A power control apparatus, controlling transmission power of a mobile unit communicating with a base station, comprising:

a command generator for generating a transmission power control command based upon the transmission power received from the mobile unit and transmitting the transmission power control command to the mobile unit, the transmission power control command controlling the transmission power; and a transmit power controller for receiving the transmission power control command and controlling the transmission power based upon a received transmission power control command;

wherein said transmit power controller varies the transmission power by implementing first and second step sizes and controls the transmission power by adaptively switching the first and second step sizes, wherein said transmit power controller includes a speed detector for detecting a speed of the mobile unit, and a step size selector for selecting either of the first and second step sizes based upon a detected speed or the mobile unit.

5. The power control apparatus of claim 4, wherein said speed detector includes, an accumulator for accumulating transmission power control commands generated in series, a counter for counting the accumulated transmission power control commands in said accumulator and determining a statistical characteristic of the accumulated transmission power control commands, and wherein said step size selector selects either of the first and second step sizes based upon the statistical characteristic.

6. The power control apparatus of claim 5, wherein said counter counts serials of the accumulated transmission power control commands.

7. The power control apparatus of claim 5, wherein said counter counts group-serials of the accumulated transmission power control commands.

8. A power control apparatus, controlling transmission power of a mobile unit communicating with a base station, comprising:

a command generator for generating a transmission power control command based upon the transmission power received from the mobile unit and transmitting the transmission power control command to the mobile unit, the transmission power control command controlling the transmission power; and a transmit power controller for receiving the transmission power control command and controlling the transmission power based upon a received transmission power control command;

wherein said transmit power controller includes a power level setter for resetting a power level of the transmission power to a mean value of previous values of the transmission power output by the mobile unit, wherein said power level setter includes a bit pattern detector for detecting a series of transmission power control commands in a predetermined pattern, an averager for calculating one of a mean value of previously generated and transmitted transmission power control commands and a mean value of previously transmitted power values, and a switch circuit for switching from control based upon a received one of the transmission power control commands to control based upon the mean value output from said averager when said bit pattern the predetermined pattern.

9. The power control apparatus of claim 8, wherein the predetermined pattern includes a bit pattern having a series of a predetermined number of the transmission power control commands of a same sign followed by another transmission power control command of opposite sign.

10. A method for controlling transmission power of a mobile unit communicating with a base station, said method comprising the steps of:

retaining a transmission power control command at the base station during a first power control delay and outputting a first delayed transmission power control command after the first power control delay;

amplifying the first delayed transmission power control command by a step size and outputting a first amplified power;

adjusting a power control error based upon the first amplified power and outputting an adjusted power control error; and judging the adjusted power control error and generating an updated transmission power control command.

11. The method of claim 10, further comprising the steps of:

retaining the first delayed transmission power control command during a second power control delay and outputting a second delayed transmission power control command after the second power control delay;

amplifying the second delayed transmission power control command by the step size and outputting a second amplified power;

wherein said adjusting step adjusts the power control error based upon the first amplified power and the second amplified power and outputs the adjusted power control error.

12. The method of claim 10, further comprising the steps of:

detecting a speed of the mobile unit; and selecting a step size optimal to the step size of said amplifying step from among a plurality of step sizes based upon the detected speed of the mobile unit.

13. The method of claim 12, wherein said detecting step includes the sub-steps of:

accumulating transmission power control commands in series and outputting accumulated transmission power control commands;

counting the accumulated transmission power control commands and outputting a counted result of the accumulated transmission power control commands and determining a statistical characteristic of the counted result of the accumulated power control commands and outputting the statistical characteristic;

wherein said selecting step selects the optimal step size based upon the statistical characteristic.

14. The method of claim 13, wherein said counting step counts one of a number of serials and group-serials of the accumulated transmission power control commands.

15. The method of claim 10, further comprising the step of resetting a power level of the transmission power to a mean value of previously outputted transmission power values from the mobile unit.

16. The method of claim 15, wherein said resetting step includes the steps of:

detecting a predetermined bit pattern of transmission power control commands, calculating one of a mean value of previously generated and transmitted transmission power control commands and a mean value of previous values of the transmitted power, and switching operation from control based upon a received one of the transmission power control commands to control based upon the mean value output in said calculating step when detecting the predetermined pattern.

17. A power control apparatus for a base station, comprising:

a command generator for generating a transmission power control command based upon a transmission power received from a mobile unit and a previous transmission power control command generated and transmitted to the mobile unit and transmitting the transmission power control command to the mobile unit, the transmission power control command controlling the transmission power of the mobile unit, wherein said command generator includes an adjuster for adjusting the transmission sower control command based upon the received transmission power and the transmission power control command, said adjuster adjusting the transmission power control command during a power control delay resulting from transmission of the transmission power control command from the base station to the mobile unit and transmission of a controlled transmission power from the mobile unit back to the base station, wherein said adjuster includes a delay circuit for holding the transmission power, control command during the power control delay and then outputting a delayed transmission power control command, an amplifier for inputting the delayed transmission power control command, predicting an additional amount of power, equivalent to the transmission power to be controlled based upon the transmission power control command at the mobile unit, and outputting a predicted additional amount of power, and an adder for adding the predicted additional amount of power to the power control error.

18. A power control apparatus for a base station, comprising:

a command generator for generating a transmission power control command based upon a transmission power received from a mobile unit and transmitting the transmission power control command to the mobile unit, the transmission power control command controlling the transmission power of the mobile unit;

wherein the mobile unit varies the transmission power by implementing first and second step sizes and controls the transmission power by adaptively switching the first and second step sizes, wherein said transmit power controller includes a speed detector for detecting a speed of the mobile unit, and a step size selector for selecting either of the first and second step sizes based upon a detected speed or the mobile unit.

19. A power control apparatus for a base station, comprising:

a command generator for generating a transmission power control command based upon a transmission power received from a mobile unit and transmitting the transmission power control command to the mobile unit, the transmission power control command controlling the transmission power of the mobile unit;

wherein the mobile unit resets a power level of the transmission power to a mean value of previous values of the transmission power output by the mobile unit, wherein said power level setter includes a bit pattern detector for detecting a series of transmission power control commands in a predetermined pattern, an averager for calculating one of a mean value of previously generated and transmitted transmission power control commands and a mean value of previously transmitted power values, and a switch circuit for switching from control based upon a received one of the transmission power control commands to control based upon the mean value output from said averager when said bit pattern the predetermined pattern.

20. A method for controlling transmission power comprising the steps of:

retaining a transmission power control command at a base station during a power control delay and outputting a delayed transmission power control command, after the power control delay, to a mobile unit;

amplifying the delayed transmission power control command by a step size and outputting an amplified power;

adjusting a power control error based upon the amplified power and outputting an adjusted power control error; and judging the adjusted power control error and generating and transmitting an updated transmission power control command to the mobile unit.

21. A power control apparatus for a mobile unit comprising:

a transmit power controller for receiving a transmission power control command from a base station, which generated the transmission power control command based upon a transmission power received from the mobile unit and a previous transmission power control command generated and transmitted to the mobile unit and controlling the transmission power of the mobile unit based upon the received transmission power control command, wherein said command generator includes an adjuster for adjusting the transmission power control command based upon the received transmission power and the transmission power control command, said adjuster adjusting the transmission power control command during a power control delay resulting from transmission of the transmission power control command from the base station to the mobile unit and transmission of a controlled transmission power from the mobile unit back to the base station, wherein said adjuster includes a delay circuit for holding the transmission power, control command during the power control delay and then outputting a delayed transmission power control command, an amplifier for inputting the delayed transmission power control command, predicting an additional amount of power, equivalent to the transmission power to be controlled based upon the transmission sower control command at the mobile unit, and outputting a predicted additional amount of power, and an adder for adding the predicted additional amount of power to the power control error.

22. A power control apparatus for a mobile unit, comprising:

a transmit power controlling for receiving a transmission power control command from a base station, which generated the transmission power control command based upon a transmission power received from the mobile unit and controlling the transmission power of the mobile unit based upon the received transmission power control command;

wherein said transmit power controller varies the transmission power by implementing first and second step sizes and controls the transmission power by adaptively switching the first and second step sizes, wherein said transmit power controller includes a speed detector for detecting a speed of the mobile unit, and a step size selector for selecting either of the first and second step sizes based upon a detected speed or the mobile unit.

23. A power control apparatus for a mobile unit comprising:

a transmit power controller for receiving a transmission power control command from a base station, which generated the transmission power control command based upon a transmission power received from the mobile unit and controlling the transmission power based upon the received transmission power control command;

said transmit power controller including a power level setter for resetting a power level of the transmission power to a mean value of previous values of the transmission power output by the mobile unit, wherein said power level setter includes a bit pattern detector for detecting a series of transmission power control commands in a predetermined pattern, an averager for calculating one of a mean value of previously generated and transmitted transmission power control commands and a mean value of previously transmitted power values, and a switch circuit for switching from control based upon a received one of the transmission power control commands to control based upon the mean value output from said averager when said bit pattern the predetermined pattern.

* * * * *